(12) United States Patent
Urakawa

(10) Patent No.: US 11,822,837 B2
(45) Date of Patent: *Nov. 21, 2023

(54) PRINTING APPARATUS AND PRINTING SYSTEM FOR PREVENTING UNDESIRED CANCELLATION OF PRINTING

(71) Applicant: Brother Kogyo Kabushiki Kaisha, Nagoya (JP)

(72) Inventor: Yutaka Urakawa, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/664,886

(22) Filed: May 25, 2022

(65) Prior Publication Data

US 2022/0413779 A1 Dec. 29, 2022

(30) Foreign Application Priority Data

Jun. 24, 2021 (JP) ................................. 2021-104831

(51) Int. Cl.
*G06F 3/12* (2006.01)
(52) U.S. Cl.
CPC .......... *G06F 3/1238* (2013.01); *G06F 3/1207* (2013.01); *G06F 3/1222* (2013.01); *G06F 3/1259* (2013.01); *G06F 3/1287* (2013.01)
(58) Field of Classification Search
None
See application file for complete search history.

(56) References Cited

U.S. PATENT DOCUMENTS

| 2006/0055957 | A1* | 3/2006 | Sakamoto | G06K 15/00 358/1.14 |
| 2017/0289380 | A1* | 10/2017 | Oguchi | G06F 3/1285 |
| 2017/0308339 | A1* | 10/2017 | Yamazaki | G06F 3/1211 |

(Continued)

FOREIGN PATENT DOCUMENTS

| JP | 2012-101480 A | 5/2012 |
| JP | 2012101480 A * | 5/2012 |
| JP | 2019-142172 A | 8/2019 |

OTHER PUBLICATIONS

U.S. Appl. No. 17/664,891, filed May 25, 2022, Urakawa, Yutaka.
U.S. Office Action dated May 2, 2023 (U.S. Appl. No. 17/664,891).

*Primary Examiner* — Henok Shiferaw
(74) *Attorney, Agent, or Firm* — BURR PATENT LAW, PLLC

(57) ABSTRACT

A printing apparatus includes a communication interface, a user interface, a memory, and a controller. The controller is configured to, in response to receiving a print instruction, perform printing of internal data stored in the memory, in response to a cancel instruction being input via the user interface, determine whether to cancel the printing of the internal data stored in the memory, based on whether the print instruction has been received via the communication interface or the user interface, and when the print instruction has been received via the communication interface, continue without canceling the printing, whereas when the print instruction has been received via the user interface, accept the cancel instruction and cancel the printing.

16 Claims, 14 Drawing Sheets

(56) References Cited

U.S. PATENT DOCUMENTS

| | | | |
|---|---|---|---|
| 2018/0024788 A1* | 1/2018 | Kamoi | G06F 3/1238 |
| | | | 358/471 |
| 2019/0303079 A1* | 10/2019 | Yamada | G06F 3/1288 |
| 2019/0369934 A1* | 12/2019 | Inoue | G06F 3/1288 |
| 2022/0413780 A1 | 12/2022 | Urakawa | |

* cited by examiner

| MFP LoginUser Name | PcUser Name | PIN | Function | | |
|---|---|---|---|---|---|
| | | | Print | Scan | Copy |
| suzuki | suzuki | 1111 | OK | OK | NG |
| kat | kato | 2222 | NG | OK | OK |
| haya | hayashi | 3333 | OK | NG | NG |
| sato | sato | 4444 | NG | NG | OK |

| Internal State | Screen ID | Key Pressing Acceptability | | |
|---|---|---|---|---|
| | | Back | Home | Cancel |
| currently receiving a print job | 101 | NG | NG | NG |
| currently printing already-stored image data | 102 | NG | NG | OK |
| currently printing image data | 102 | NG | NG | OK |
| currently receiving a print instruction | - | NG | NG | NG |
| currently printing the MFP report according to the instruction from the panel | 103 | NG | NG | OK |
| currently printing the MFP report according to the external instruction | 104 | NG | NG | NG |
| operation completed | 100 | NG | OK | NG |
| currently receiving a print job (the user who has sent the print instruction is logging in) | 105 | NG | NG | OK |
| currently receiving a print job (via USB connection) | 105 | NG | NG | OK |

| Screen ID | Display Screen |
|---|---|
| 100 | Home Screen |
| 101 | Reception-in-progress Screen |
| 102 | Printing-in-progress Screen |
| 103 | Printing-in-progress Screen |
| 104 | Printing-in-progress Screen |
| 105 | Reception-in-progress Screen |

```
<ESC>%-12345X@PJL
@PJL  SET HOLD=OFF
@PJL  SET JOBNAME="test.txt"
@PJL  SET USERNAME="suzuki"
@PJL SET JOBTIME = "20210413201010"
@PJL SET STRINGCODESET=JISX02011976
@PJL SET RESOLUTION=600
@PJL ENTER LANGUAGE=PCLXL
)HP-PCL XL;2;0
.
.
.
PDL
.
.
.
<ESC>%-12345X
```

PRINTING APPARATUS AND PRINTING SYSTEM FOR PREVENTING UNDESIRED CANCELLATION OF PRINTING

REFERENCE TO RELATED APPLICATIONS

This application claims priority from Japanese Patent Application No. 2021-104831 filed on Jun. 24, 2021. The entire content of the priority application is incorporated herein by reference.

BACKGROUND ART

An image forming apparatus has been known that is configured to receive a print instruction to print a report from a user via an operation interface.

DESCRIPTION

However, in the known image forming apparatus, while a report is being printed in response to a print instruction from an external device outside the image forming apparatus, the printing may be canceled by another person (e.g., an operator who is operating the image forming apparatus) other than the user who has sent the print instruction.

Aspects of the present disclosure are advantageous to provide one or more improved techniques for a printing apparatus that make it possible to prevent others from canceling a printing operation, in progress, of printing internal data stored in a memory.

According to aspects of the present disclosure, a printing apparatus is provided, which includes a communication interface, a user interface, a memory, and a controller. The controller is configured to, in response to receiving a print instruction, perform printing of internal data stored in the memory. The controller is further configured to, in response to a cancel instruction being input via the user interface, determine whether to cancel the printing of the internal data stored in the memory, based on whether the print instruction has been received via the communication interface or the user interface. The controller is further configured to, when the print instruction has been received via the communication interface, continue without canceling the printing, whereas when the print instruction has been received via the user interface, accept the cancel instruction and cancel the printing.

According to aspects of the present disclosure, further provided is a printing apparatus that includes a communication interface, a user interface, a memory, and a controller. The controller is configured to receive a print job via the communication interface. The controller is further configured to perform printing. The controller is further configured to determine whether to cancel the print job in response to a cancel instruction input via the user interface while the print job is being received, based on a first condition. The controller is further configured to determine whether to cancel the printing in response to a cancel instruction input via the user interface while the printing is being performed, based on a second condition different from the first condition.

According to aspects of the present disclosure, further provided is a printing system that includes an information processing device and a printing apparatus. The printing apparatus includes a communication interface configured to perform communication with the information processing device. The printing apparatus further includes a user interface, a memory, and a controller. The controller is configured to, in response to receiving a print instruction, perform printing of internal data stored in the memory. The controller is further configured to, in response to a cancel instruction being input via the user interface, determine whether to cancel the printing of the internal data stored in the memory, based on whether the print instruction has been received from the information processing device via the communication interface or received via the user interface. The controller is further configured to, when the print instruction has been received from the information processing device via the communication interface, continue without canceling the printing, whereas when the print instruction has been received via the user interface, accept the cancel instruction and cancel the printing.

FIG. 1 is a block diagram schematically showing a configuration of a printing system including an MFP.

FIGS. 2A, 2B, and 2C show examples of screens on a panel that differ according to changes in an internal state of the MFP.

FIGS. 3A, 3B, 3C, and 3D show other examples of screens on the panel that differ according to changes in the internal state of the MFP.

FIGS. 4A, 4B, and 4C show an example of data stored in an NVM of the MFP.

FIG. 5 shows an example of a data structure of a print job.

FIGS. 6A, 6B, and 6C are flowcharts showing a procedure of a receiving-and-printing process.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
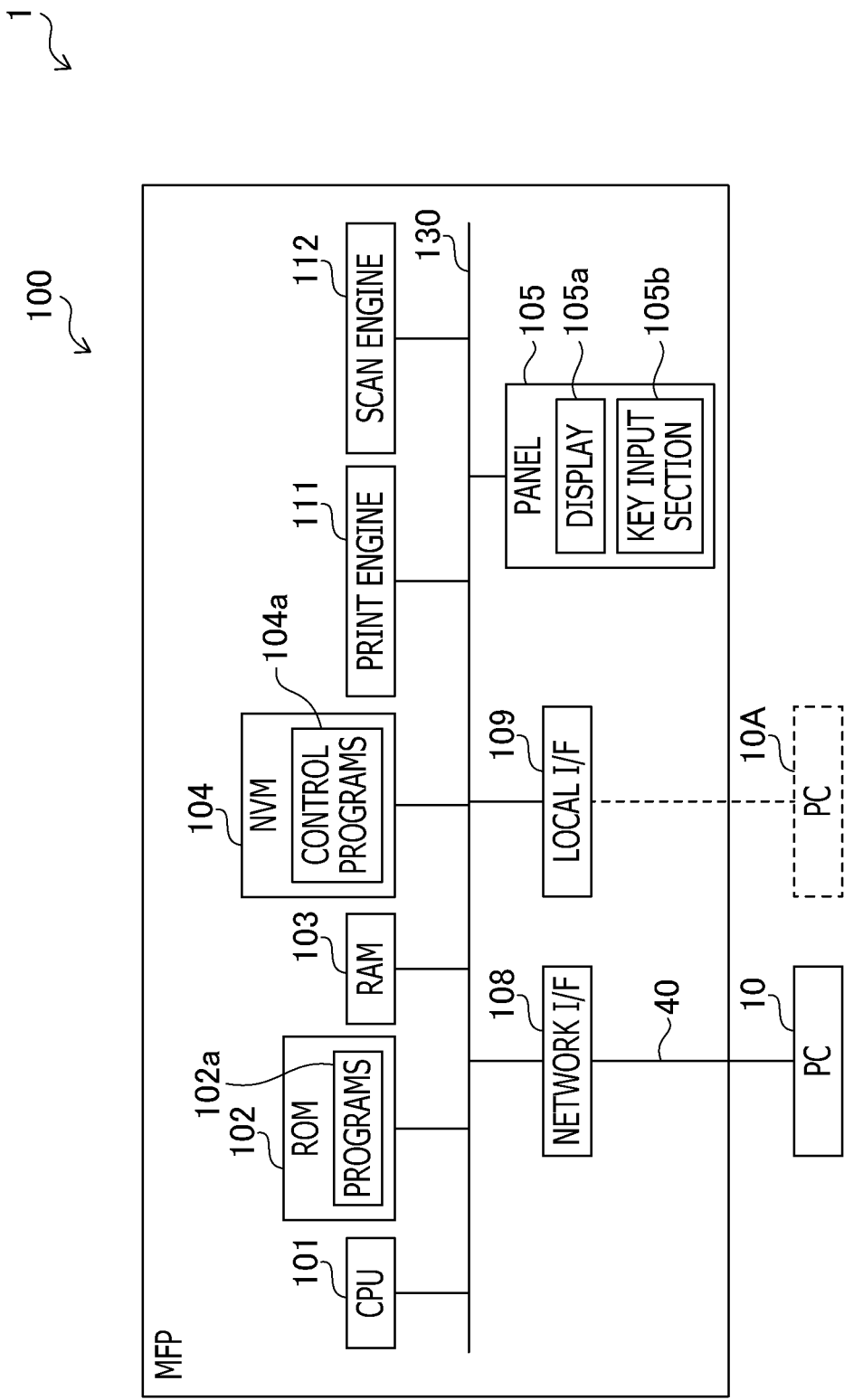

An illustrative embodiment according to aspects of the present disclosure will be described with reference to the accompanying drawings. FIG. 1 shows a control configuration for a printing system 1 in the illustrative embodiment. The printing system 1 includes an MFP ("MFP" is an abbreviation for "Multi-Function Peripheral") 100 and a PC 10.

The MFP 100 has a fax function, a copy function, a scanning function, and a printing function. The MFP 100 includes a CPU 101, a ROM 102, a RAM 103, and an NVM ("NVM" is an abbreviation for "Non-Volatile Memory") 104.

The CPU 101 is configured to take overall control of the MFP 100. The ROM 102 stores programs (e.g., a bootloader) 102a used to start up the MFP 100. The NVM 104 stores control programs 104a and setting information. For instance, the stored control programs include programs for after-mentioned processes such as a receiving-and-printing process (see FIGS. 6A to 6C), a panel operation process (see FIG. 7), a display process (see FIGS. 8A and 8B), and a login process (see FIG. 9). The CPU 101 reads out the control programs stored is the NVM 104 and performs various processes. The RAM 103 is configured to temporarily store print jobs and image data. In addition, the RAM 103 may be used as a storage area to temporarily store data and signals used for the CPU 101 to execute the control programs, and as a work area for data processing.

Further, the MFP 100 includes a panel 105. The panel 105 has a display 105*a* and a key input section 105*b*. In the illustrative embodiment, the display 105*a* includes a touch panel configured to receive user touch operations, and displays various screens depending on a state of the MFP 100. The user of the MFP 100 may perform input operations by touching input buttons displayed on each screen on the display 105*a*. The key input section 105*b* includes a plurality of keys (e.g., three keys). Each key is configured to be switched between a turned-on state and a turned-off state, for instance, in response to a backlight for each key being turned on and off.

Further, the MFP 100 includes a network I/F ("I/F" is an abbreviation for "interface") 108. The network I/F 108 is configured to connect the MFP 100 communicably with a communication network 40. In the illustrative embodiment, the PC 10 is connected with the communication network 40. Thereby, the MFP 100 is enabled to perform communication of various types of data with the PC 10. Examples of the communication network 40 may include various types of networks such as a wired LAN, a wireless LAN, a wired WAN, and a wireless WAN.

Further, the MFP 100 includes a local I/F 109. The local I/F 109 is configured to establish a local connection between the MFP 100 and each of external devices (e.g., a PC 10A, an HDD, and a CD ROMD) over a short distance. Applicable connection methods for the local I/F 109 may include, but are not limited to, USB and NFC ("NFC" is an abbreviation for "Near Field Communication"). In the illustrative embodiment, a USB I/F is employed as the local I/F 109.

Further, the MFP 100 includes a print engine 111 and a scan engine 112. The print engine 111 is an electrophotographic print engine. Other applicable printing methods for the print engine 111 may include, but are not limited, an inkjet method and a thermal method. The scan engine 112 is a mechanism configured to scan images from a document. The scan engine 112 includes a sensor such as a CCD or a CIS.

The CPU 101, the ROM 102, the RAM 103, and the NVM 104, the panel 105, the network I/F 108, the print engine 111, and the scan engine 112 are interconnected via a bus 130.

The present disclosure basically shows processes to be performed by the CPU 101 in accordance with instructions described in programs (e.g., the programs 102*a* and the control programs 104*a*). Namely, each of processes such as "determining," "judging," "extracting," "selecting," "calculating," "specifying," "identifying," "obtaining," "acquiring," "receiving," "accepting," "controlling," and "setting" in the following description may represent a process by the CPU 101. The processes by the CPU 101 includes hardware control via an OS. It is noted that "obtaining" or "acquiring" may be used as a concept that does not necessarily require a request. Namely, a process of receiving data without the CPU 101 making a request for the data may be included in a concept of "the CPU 101 obtaining (acquiring) data." Further, "data" in the present disclosure may be expressed in a computer-readable bit sequence. Additionally, a plurality of pieces of data having substantially the same meaning or content but expressed in different formats shall be treated as the same data. The same may apply to "information" in the present disclosure. Moreover, processes such as "instructing," "responding," and "requesting" may be performed by transmission of information such as an "instruction," a "response," and a "request." Furthermore, wording such as "instruction," "response," or "request" may be described in the sense of information itself that indicates an "instruction," a "response," or a "request."

Figure 6A:
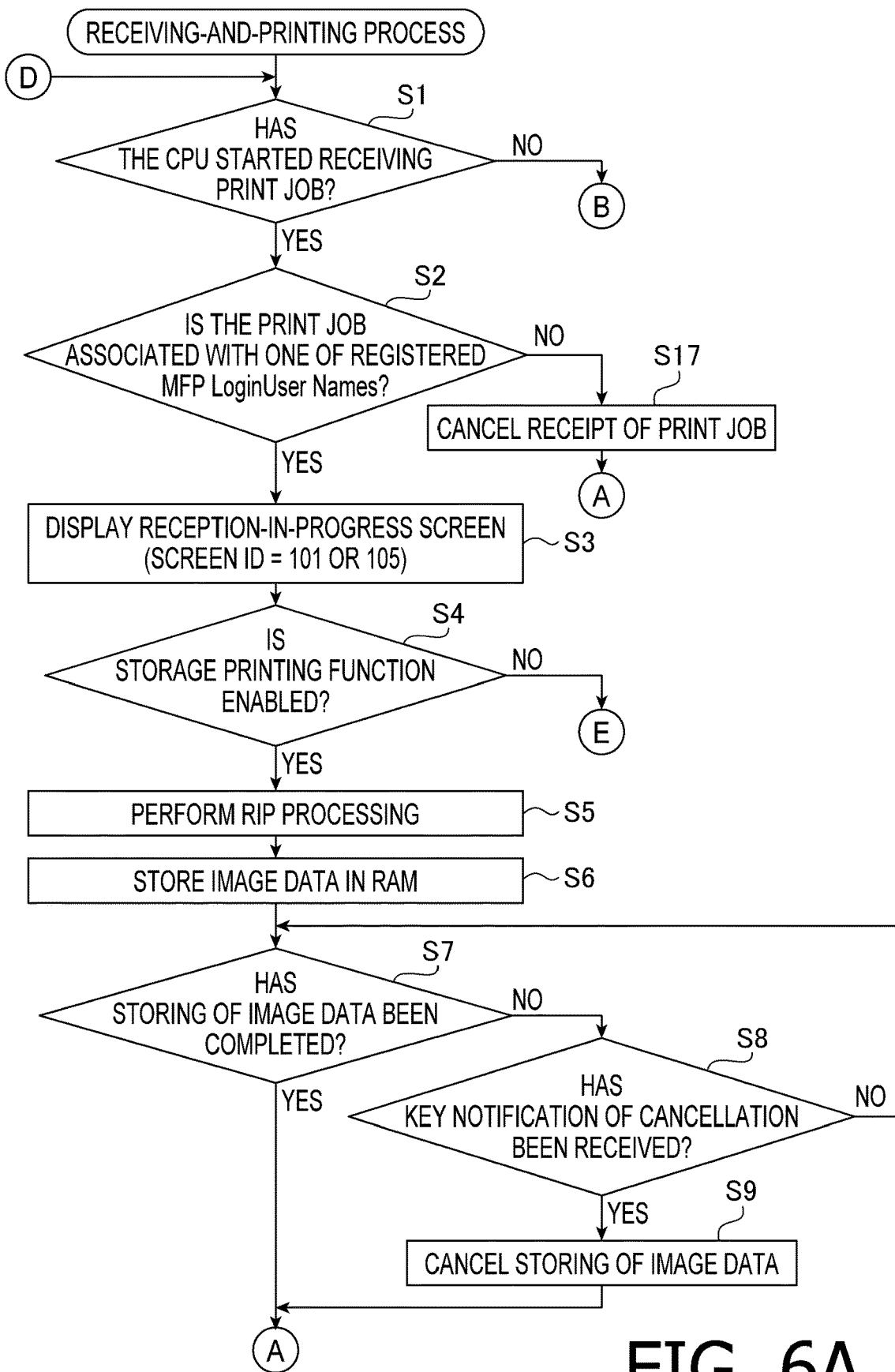
Figure 6B:
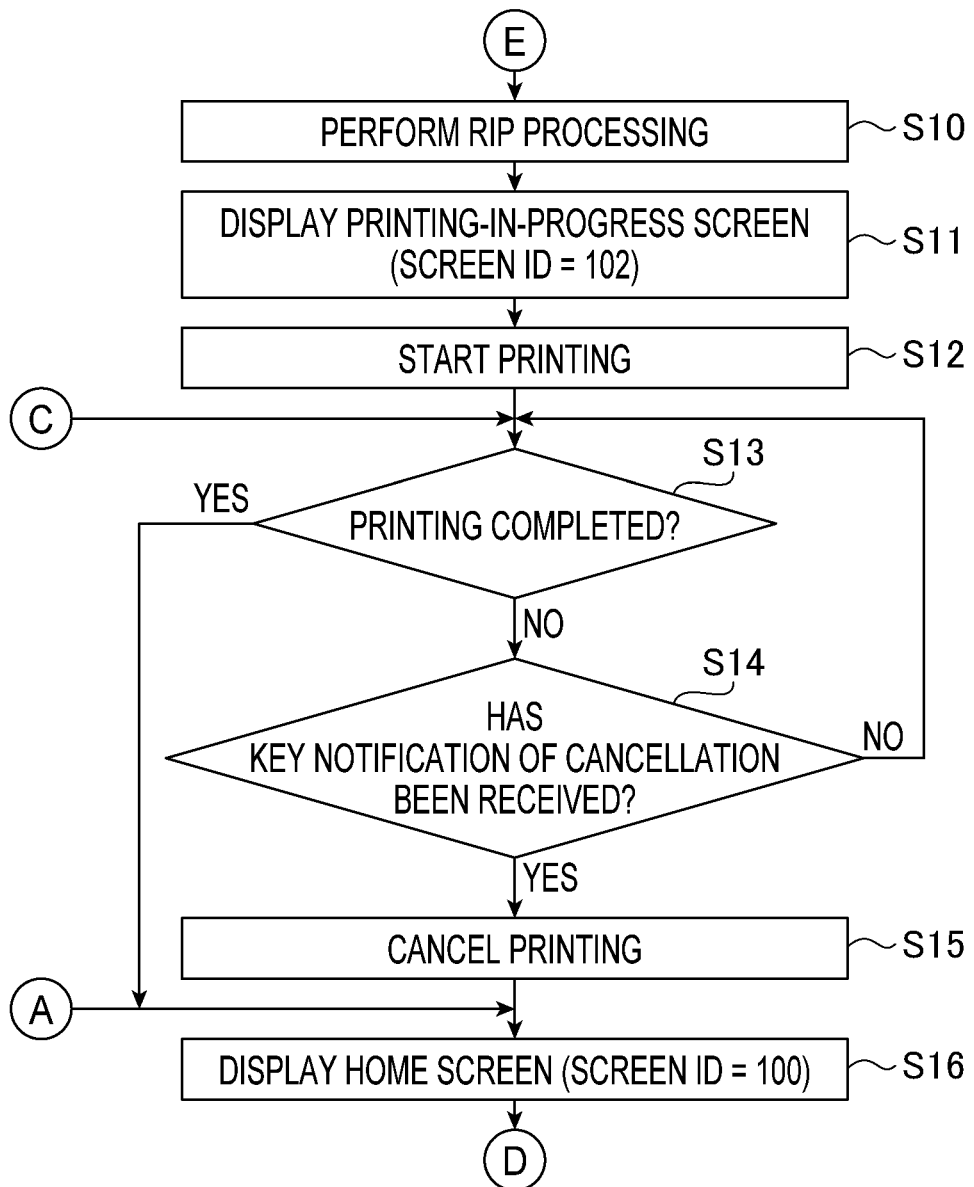
Figure 6C:
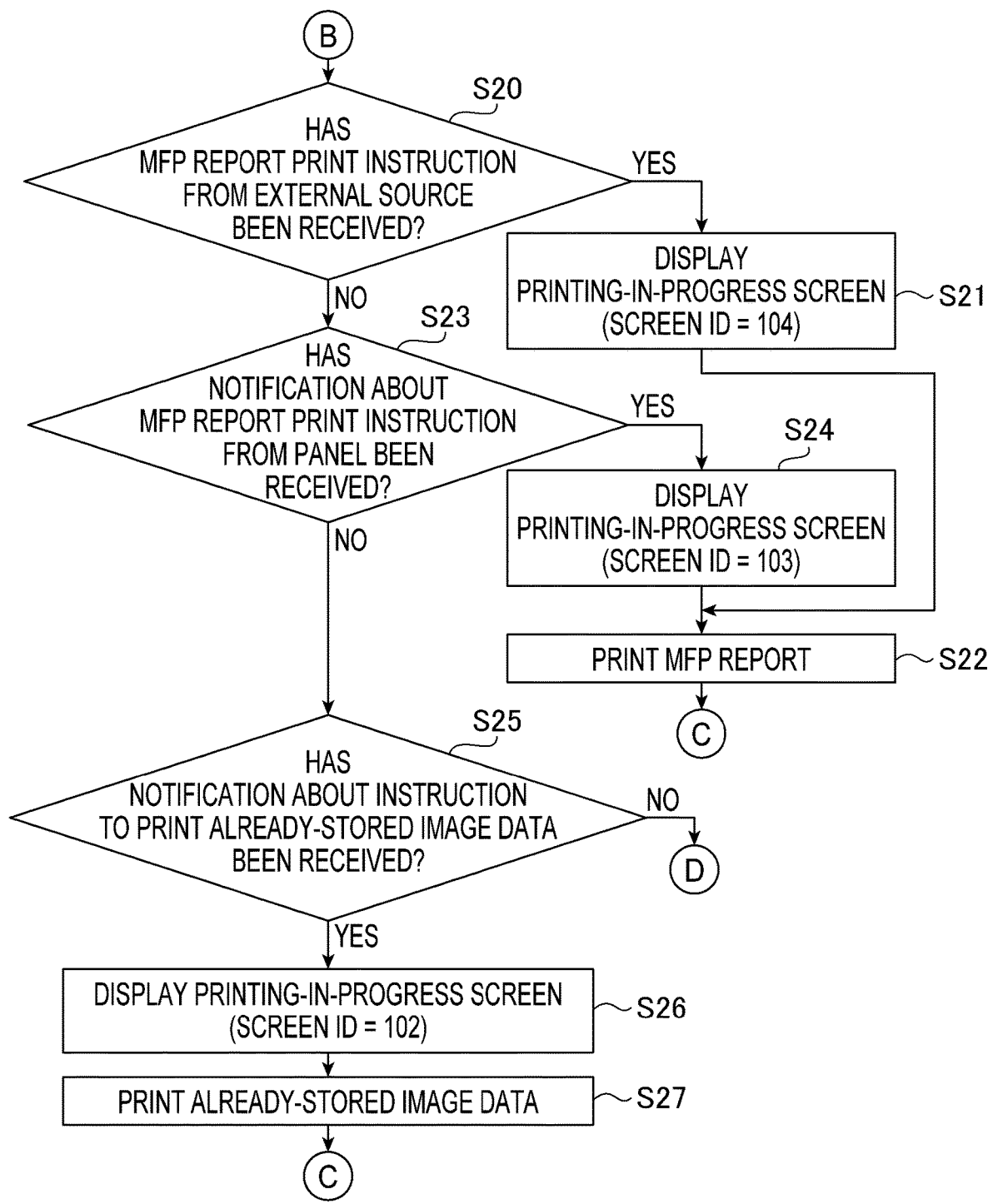

When the MFP 100 is turned on, the CPU 101 performs an initialization process (not shown), and starts a panel operation process (see FIG. 7), a display process (see FIGS. 8A and 8B), and a receiving-and-printing process (see FIGS. 6A to 6C). Hereinafter, each step will be denoted with "S" added in front of a corresponding numeral in the description of each processing procedure.

Figure 2A:
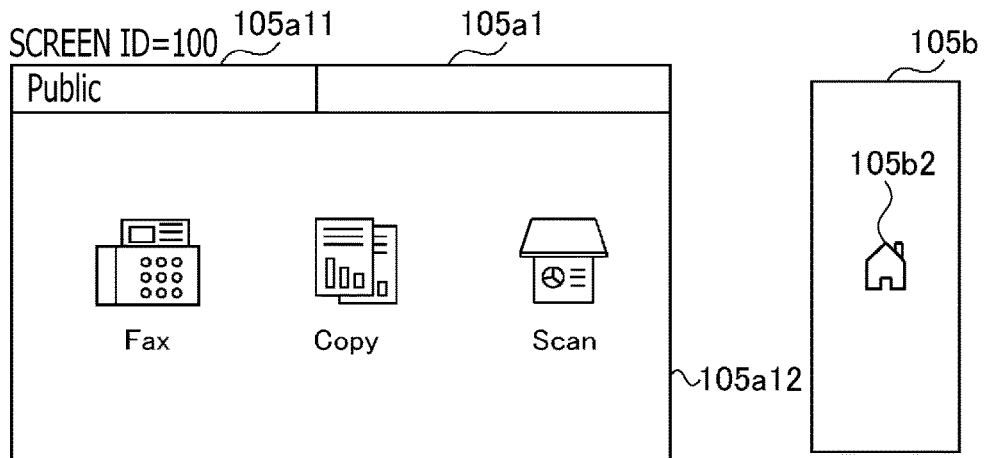
Figure 8A:
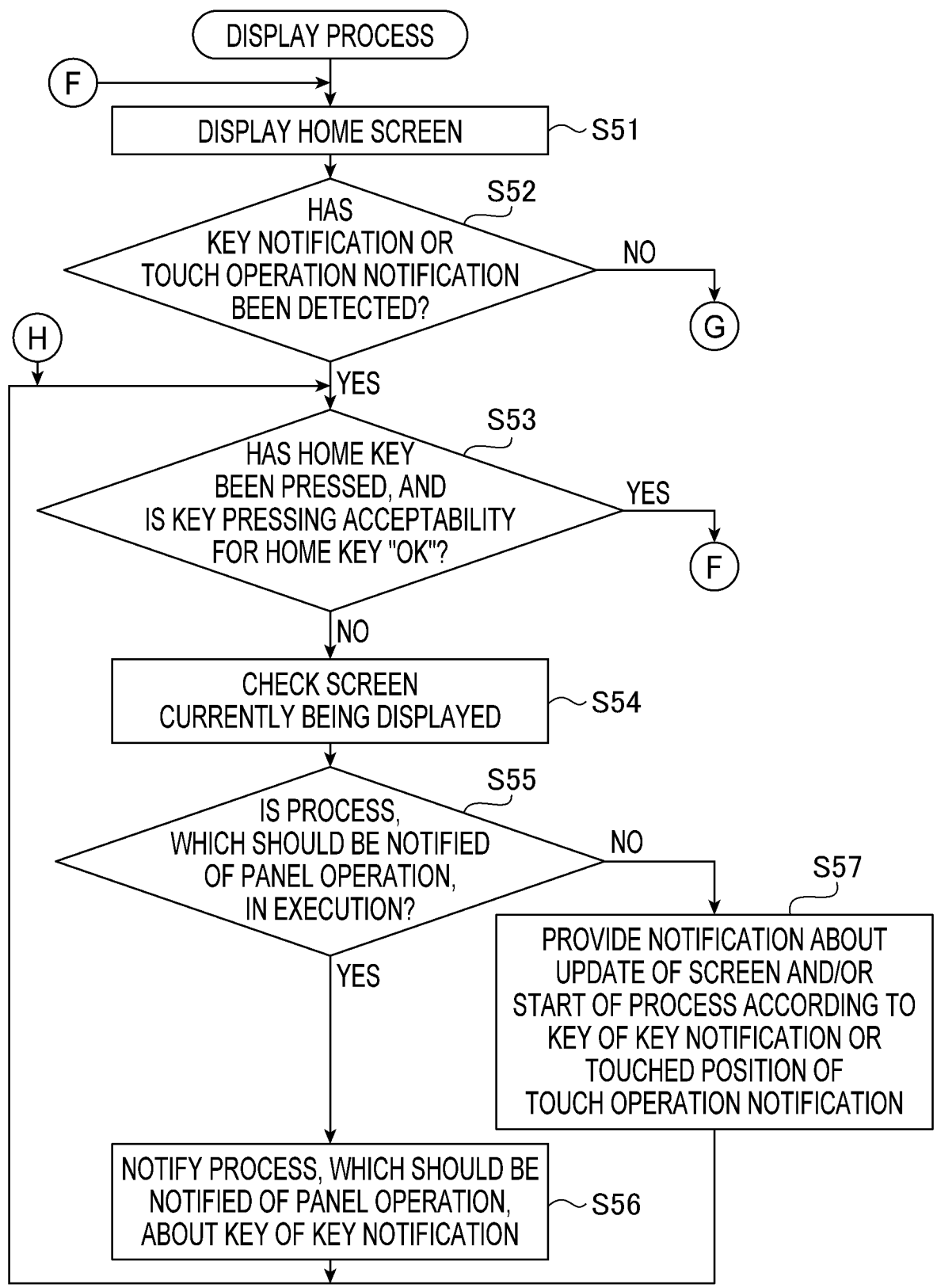
FIGS. 8A and 8B are flowcharts showing a procedure of a display process.
Figure 8B:
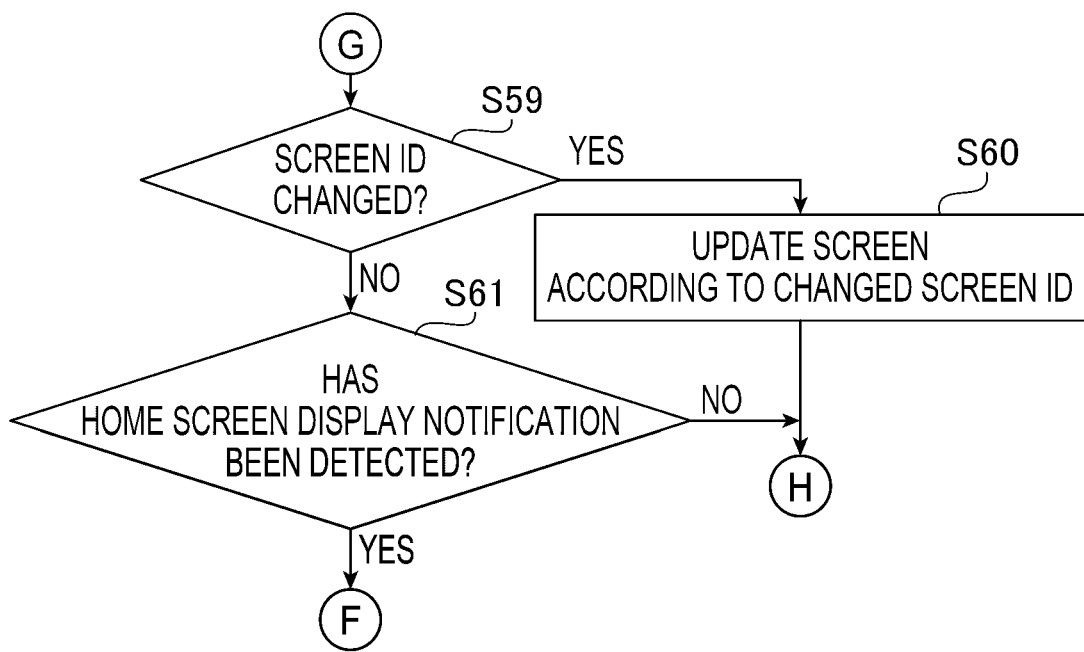

After starting the display process shown in FIGS. 8A and 8B, the CPU 101 first displays a home screen on the display 105*a* (S51). FIG. 2A shows an example of the home screen (screen ID=100) 105*a*1 displayed on the display 105*a*. The home screen 105*a*1 has a "Public" button 105*a*11 and a function selection area 105*a*12. The function selection area 105*a*12 is for selecting a function from among the fax function, the copy function, and the scanning function. Each screen displayed on the display 105*a* is associated with a screen ID. The screen displayed on the display screen 105*a* is switched from one screen to another in response to switching of the screen ID. The screen ID is written by the CPU 101 into a screen ID storage area (not shown) provided in the RAM 103, for instance, in an after-mentioned step S3 of the receiving-and-printing process.

Figure 7:
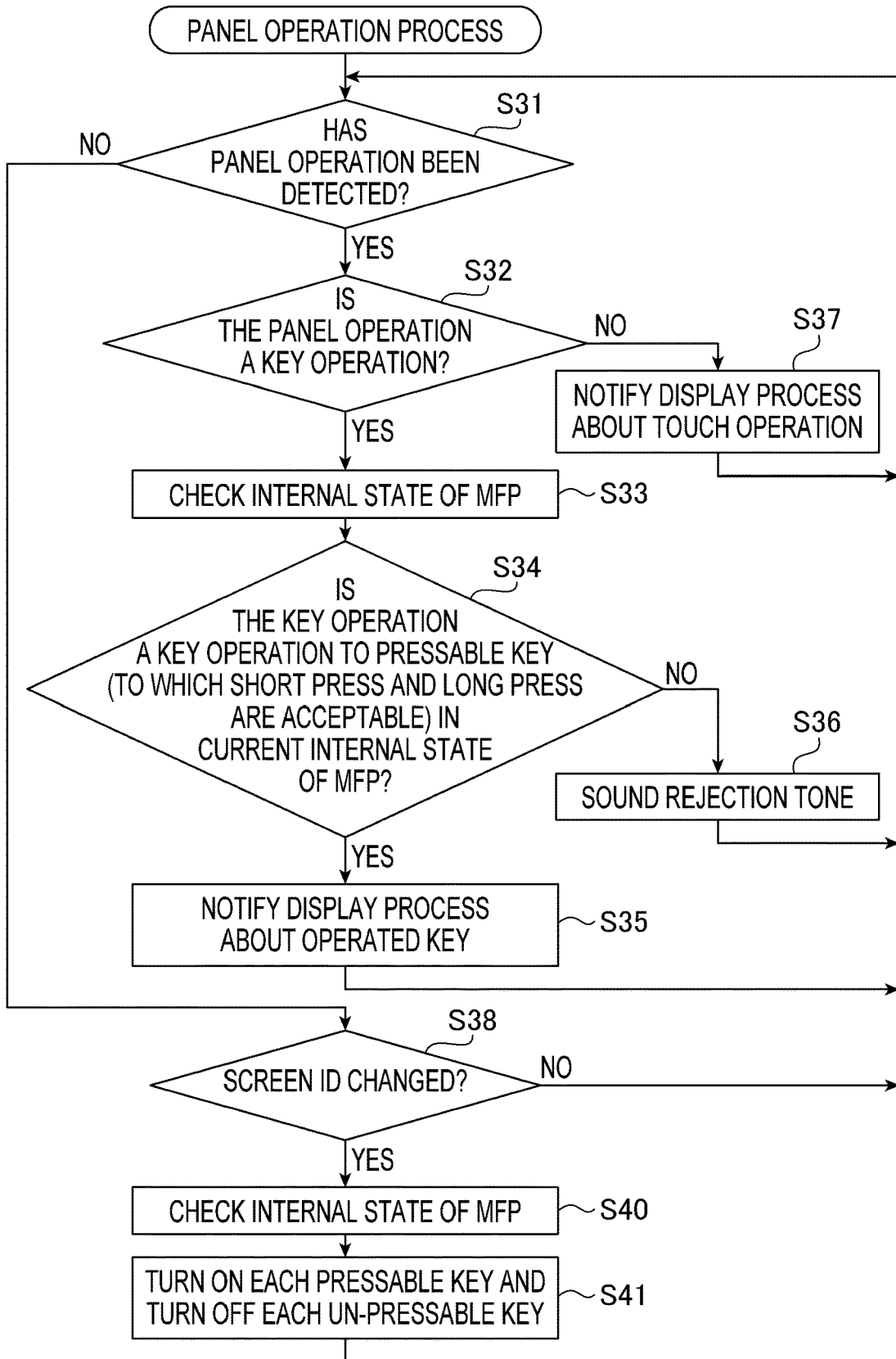
FIG. 7 is a flowchart showing a procedure of a panel operation process.

Further, after starting the panel operation process shown in FIG. 7, the CPU 101 first determines whether a panel operation to the panel 105 has been detected (S31). When determining that no panel operation to the panel 105 has been detected (S31: No), the CPU 101 next determines whether the screen ID has changed (S38). When determining that the screen ID has not changed (S38: No), the CPU 101 goes back to S31. Then, the CPU 101 repeatedly makes the determinations in S31 and S38 until a panel operation to the panel 105 is detected (S31: Yes) or until the screen ID changes (S38: Yes). It is noted that examples of the panel operation to the panel 105 may include, but are not limited to, touch operations to the display 105*a* of the panel 105, and key operations to the key input section 105*b* of the panel 105.

For example, when a touch operation to the "Public" button 105*a*11 has been detected while the home screen 105*a*1 is displayed on the display 105*a*, the CPU 101 determines that a panel operation to the panel 105 has been detected, and makes an affirmative determination in S31 (S31: Yes). Next, the CPU 101 determines whether the panel operation is a key operation to the key input section 105*b* (S32). In this example case, the panel operation is the touch operation to the display 105*a* (S32: No). Therefore, the CPU 101 provides a notification (hereinafter, which may be referred to as a "touch operation notification") about the touch operation to the display process (S37). Specifically, for instance, the CPU 101 provides the notification by storing the notification (information) about the touch operation into a touch operation storage area (not shown) provided in the RAM 103. Examples of the information stored as the touch operation notification may include, but are not limited to, a touched position on the display 105*a*.

In the above display process, after S51, the CPU 101 determines whether or not a key notification or a touch operation notification has been detected (S52). The CPU 101 provides the key notification in an after-mentioned step S35 of the above panel operation process (see FIG. 7). Specifically, for instance, the CPU 101 provides the key notification by storing the key notification into a key notification storage area (not shown) provided in the RAM 103, in substantially the same manner as the touch operation notification. However, unlike the touch operation notification, the information stored as the key notification in the key notification storage area contains information for identifying an operated one of the three keys included in the key input section 105*b*. Thus, the key notification is stored in the key notification storage area, and the touch operation notification is stored in the touch operation notification storage area. Accordingly, in the aforementioned step S52, the CPU 101 determines whether or not a key notification or a touch operation notification is stored in a corresponding storage area (i.e., in the key notification storage area or the touch operation notification storage area).

When neither a key notification nor a touch operation notification has been detected (S52: No), the CPU 101 determines whether the screen ID written in the above screen ID storage area has changed (S59). When determining that the screen ID written in the screen ID storage area has not changed (S59: No), the CPU 101 determines whether a home screen display notification has been detected (S61). When determining that the home screen display notification has not been detected (S61: No), the CPU 101 goes back to S52. Thus, after S51, the CPU 101 repeatedly makes the determinations in S52, S59, and S61 until a key notification or a touch operation notification is detected (S52: Yes), or until the screen ID changes (S59: Yes), or until the home screen display notification is detected (S61: Yes).

When a notification is provided about a touch operation to the "Public" button 105*a*11 in S37 (see FIG. 7) while the CPU 101 is repeatedly making the determinations in S52, S59, and S61 in the display process, the CPU 101 makes an affirmative determination in S52 (S52: Yes). In this case, the CPU 101 next determines whether a home key 105*b*2 has been pressed among the three keys of the key input section 105*b*, and key pressing acceptability information for the home key 105*b*2 is "OK" (S53).

FIG. 4B shows an example of table data 104*b* that indicates a screen and key pressing acceptability according to an internal state of the MFP 100. For instance, the table data 104*b* is stored in the NVM 104. The table data 104*a* contains the internal state of the MFP 10, the screen ID for identifying a screen to be displayed on the display 105*a* of the panel 105 in the internal state of the MFP 10, and key pressing acceptability information. The key pressing acceptability information represents whether, when each of the three keys (i.e., a back key 105*b*1, the home key 105*b*2, and a cancel key 105*b*3) included in the key input section 105*b* of the panel 105 is pressed, the pressing is acceptable as valid pressing ("OK" in FIG. 4B) or unacceptable ("NG" in FIG. 4B). In the example shown in FIG. 4B, when the internal state of the MFP 100 is "currently receiving a print instruction," there is no screen ID (-) registered for that internal state. This is because a period of time during which the internal state of the MFP 10 is "currently receiving a print instruction" is very short, and therefore there is little need to switch the screen on the display 105*a* to a screen for the state "currently receiving a print instruction." Of course, aspects of the present disclosure are not limited to this, but a screen ID for identifying the screen for "currently receiving a print instruction" may be determined, and the screen for "currently receiving a print instruction" may be displayed. Moreover, as shown in FIG. 4C, the NVM 104 contains display screen data 104*c* stored in association with each screen ID.

A plurality of potential internal states of the MFP 100 are previously defined. The CPU 101 selects a state that matches the current state of the MFP 100 from among the plurality of potential internal states. At this time, for instance, the CPU 101 determines the selected state as the current internal state of the MFP 100 by storing the selected state into an internal state storage area (not shown) provided in the RAM 103. Accordingly, the determined internal state of the MFP 100 is the internal state stored in the internal state storage area of the RAM 103. The CPU 101 writes the internal state of the MFP 100 into the internal state storage area of the RAM 103 as appropriate when there is a need to switch the current internal state to another internal state.

Referring back to FIG. 8A, in the present example case, the touch operation notification has been detected instead of a key notification. Therefore, after determining that the home key 105*b*2 has not been pressed and making a negative determination in S53 (S53: No), the CPU 101 checks the screen currently being displayed (S54). Specifically, in S54, the CPU 101 determines which screen is currently displayed, by checking the screen ID written in the screen ID storage area. Then, based on the checked screen, the CPU 101 determines whether a process, which should be notified of the panel operation, is in execution (S55). When the screen ID checked in S54 is 100, the CPU101 determines that the process, which should be notified of the panel operation, is not in execution (S55: No). Meanwhile, when the screen ID checked in S54 is any of 101 to 105, the CPU101 determines that the receiving-and-printing process (see FIGS. 6A to 6C) is in execution as the process which should be notified of the panel operation (S55: Yes). In the present example case, the screen ID is 100. Therefore, the CPU 101 makes a negative determination in S55 (S55: No), and proceeds to S57. In S57, the CPU 101 provides a notification about update of the screen and/or the start of the process according to the key corresponding to the key notification or the touched position corresponding to the touch operation notification. The touch operation to the "Public" button 105*a*11 is for providing an instruction to start the login process (see FIG. 9). Hence, in S57, the CPU 101 updates the screen on the display 105*a* according to the touched position, and provides a notification about the start of the login process.

Figure 9:
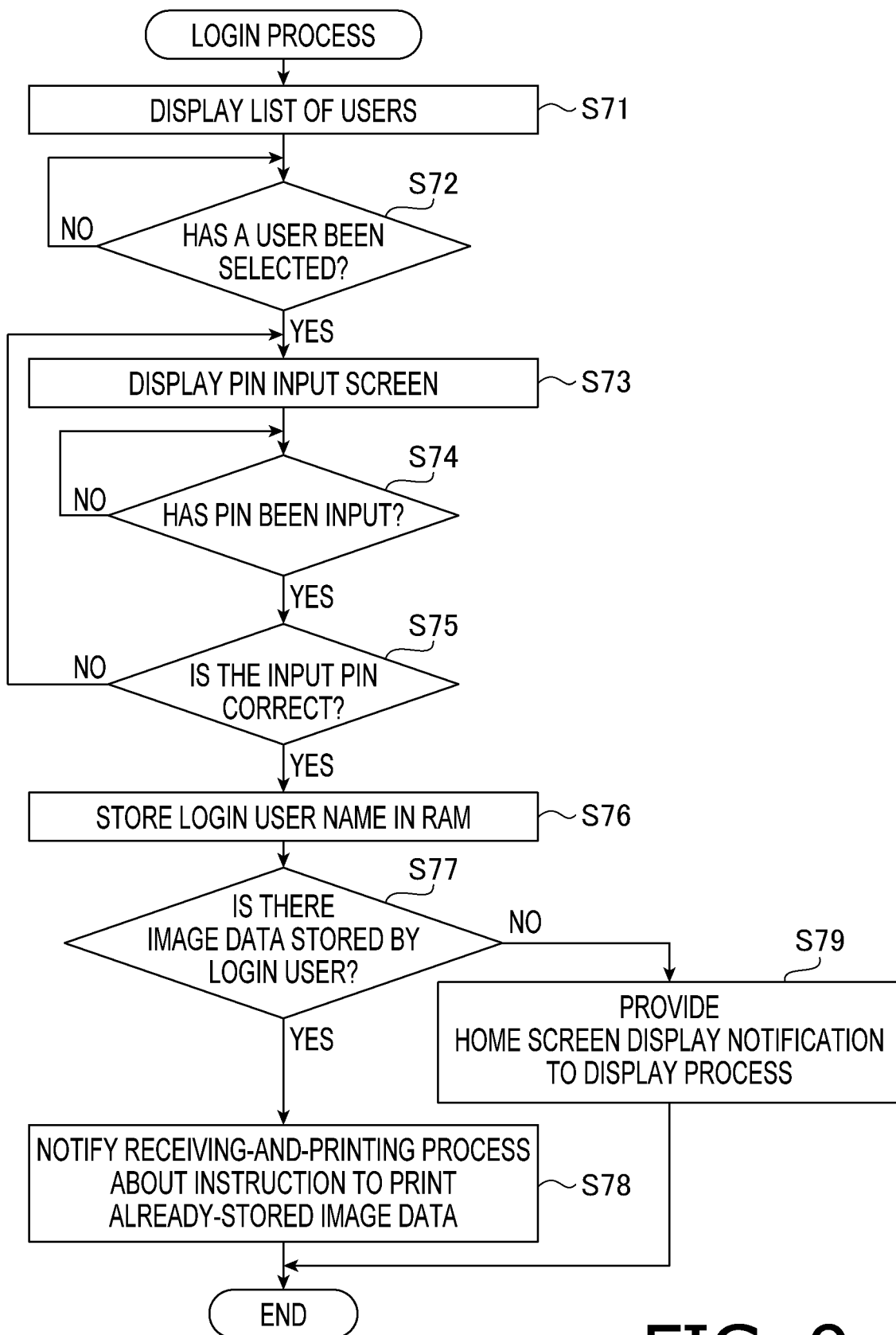
FIG. 9 is a flowchart showing a procedure of a login process.

In response to the processing in S57, the CPU 101 starts the login process shown in FIG. 9. In the login process, the CPU 101 first displays a list of users on the display 105*a* (S71).

Figure 2B:
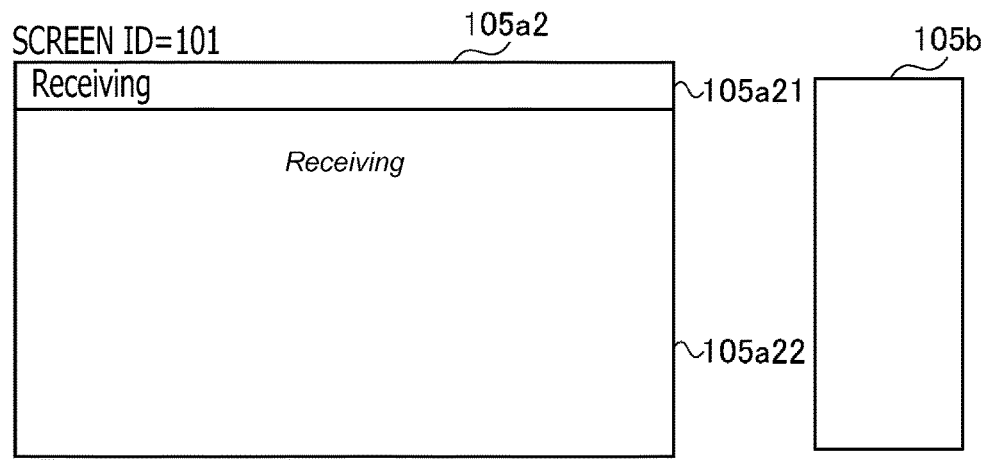
Figure 2C:
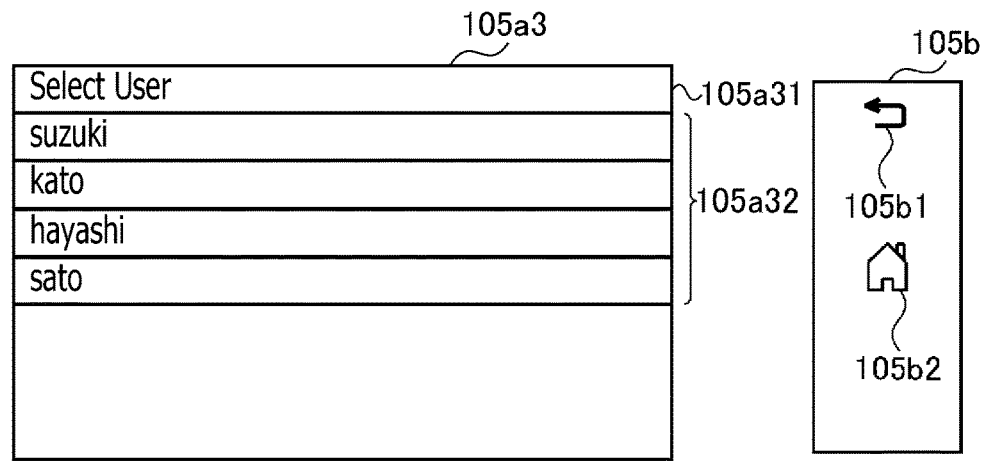

FIG. 2C shows an example of the user selection screen 105*a*3 displayed on the display 105*a*. The user selection screen 105*a*3 includes a display area 105*a*31 and a user list display area 105*a*32. The display area 105*a*31 is configured to show a display (e.g., "Select User") for instructing (prompting) user selection. The user list display area 105*a*32 is configured to show a list of users. The operator of the MFP 100 is allowed to proceed to login authentication by selecting his or her own user name from the users listed in the user list display area 105*a*32.

FIG. 4A shows an example of a user DB ("DB" is an abbreviation for "database") 104*a* for login management and function restriction management. For instance, the user DB 104*a* is created by an administrator who manages the MFP 10. The user DB 104*a* is stored in the NVM 104. The user DB104*a* contains items such as an "MFP LoginUser Name," a "PcUser Name," a "PIN," and a "Function."

The "MFP LoginUser Name" represents user names used to log in to the MFP 100. The "PcUser Name" represents an alias associated with each user name registered as the "MFP LoginUser Name." In the aforementioned step S71, the list of users to be shown on the display 105a is a list of users with the "MFP LoginUser Names" registered in the DB 104a.

The "PIN" represents a personal identification number associated with each registered user. The "PIN" is previously registered as a set with the "MFP LoginUser Name." Each "PIN" is used for login authentication for a corresponding user to log in to the MFP 100.

The "Function" provides information for the aforementioned function restriction management. Specifically, the "Function" indicates whether the user registered in association with each "MFP LoginUser Name" is allowed to use the printing function, the scanning function, and the copy function (see "Print," "Scan," and "Copy" in FIG. 4A). In other words, the user registered in association with each "MFP LoginUser Name" is allowed to use the function(s) for which "OK" is registered, but is not allowed to use the function(s) for which "NG" is registered. For instance, a user with "suzuki" as the "MFP LoginUser Name," after having logged in to the MFP 100, is allowed to use the printing function and the scanning function of the MFP 100 but is not allowed to use the copy function.

Referring back to FIG. 9, for instance, the CPU 101 waits until one of the users listed in the list display area 105a32 is selected (S72: No). Meanwhile, when one of the users listed in the list display area 105a32 has been selected (S72: Yes), the CPU 101 displays a PIN input screen on the display 105a (S73).

Next, the CPU 101 waits until a PIN is input (S74: No). Meanwhile, when a PIN has been input (S74: Yes), the CPU 101 determines whether the input PIN is correct (S75).

When determining in S75 that the input PIN is correct (S75: Yes), the CPU 101 stores into the RAM 103 the login user name, i.e., the selected MFP LoginUser Name (S76). Thereafter, the CPU 101 determines whether there is image data stored by the login user (S77). Hereinafter, the selected MFP LoginUser Name may be referred to as the "selected LoginUser Name." Namely, in S77, The CPU 101 determines whether image data, associated with the MFP LoginUser Name matching the selected LoginUser Name, is stored. In S6 of FIG. 6A, the CPU 101 stores image data in association with the MFP LoginUser Name that indicates a user who sent a print job which the image data is based on. The processing in S6 will be described in detail later.

When determining in S77 that there is image data stored by the login user (i.e., the user indicated by the selected LoginUser Name) (S77), the CPU 101 notifies the receiving-and-printing process about an instruction to print the already-stored image data (S78). Thereafter, the CPU 101 terminates the login process.

When the CPU 101 proceeds from S77 to S78, a plurality of pieces of image data may have been stored by the login user. In this case, for instance, the CPU 101 may display respective file names of the plurality of pieces of image data on the display 105a, and may allow the login user to select a file name of image data that the login user wishes to print from among the file names displayed on the display 105a. In another instance, the CPU 101 may set all the plurality of pieces of image data to be printed, without allowing the login user to make a selection therefrom. Thus, the same user may store a plurality of pieces of image data. Hereinafter, however, it is assumed for the sake of explanatory convenience that each individual user stores only one image data.

Figure 3A:
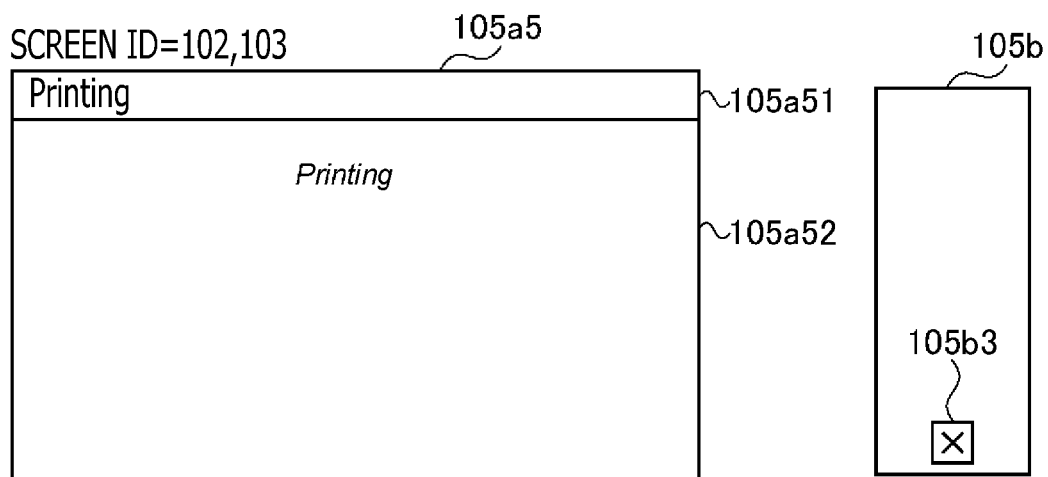
Figure 3B:
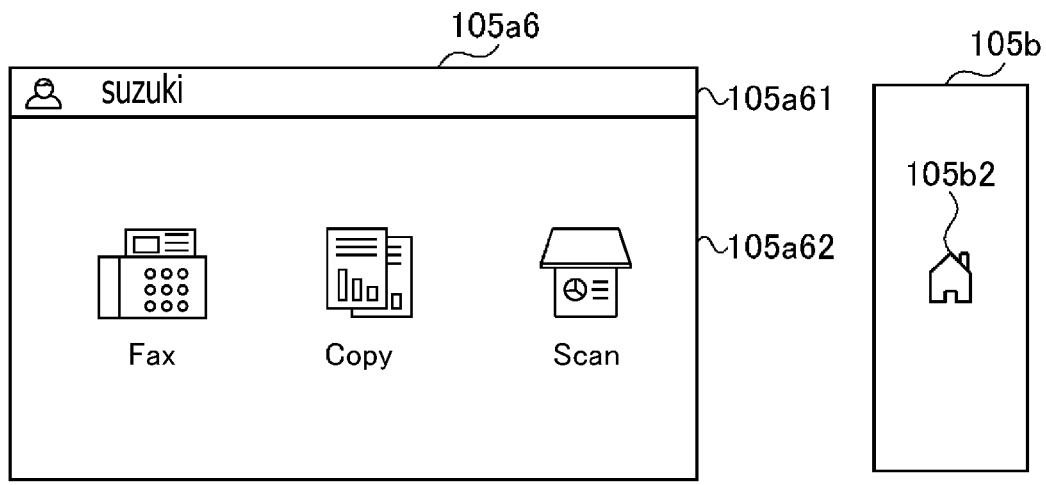

On the other hand, when determining in S77 that there is no image data stored by the login user (S77: No), the CPU 101 provides the home screen display notification to the display process (S79). Thereafter, the CPU 101 terminates the login process. In the aforementioned step S61 (see FIG. 8B) of the display process, when determining that the home screen display notification has been detected (S61: Yes), the CPU 101 goes back to S51 and displays the home screen on the display 105a (S51). At this time, the CPU 101 determines whether the selected LoginUser Name is stored in the RAM 103. Then, when determining that the selected LoginUser Name is stored in the RAM 103, the CPU 101 displays a logged-in home screen on the display 105a. FIG. 3B shows an example of the logged-in home screen 105a6 displayed on the display 105a. The logged-in home screen 105a6 includes a display area 105a61 to display the selected LoginUser Name, and a function selection area 105a62. When the selected LoginUser name, displayed in the display area 105a61 of the logged-in home screen 105a6, is touched, and an operation to log out of the MFP 100 is performed, the CPU 101 deletes the selected LoginUser Name stored in the RAM 103. At this time, the screen on the display 105a makes the transition to the home screen 105a1 (see FIG. 2A).

Figure 10:
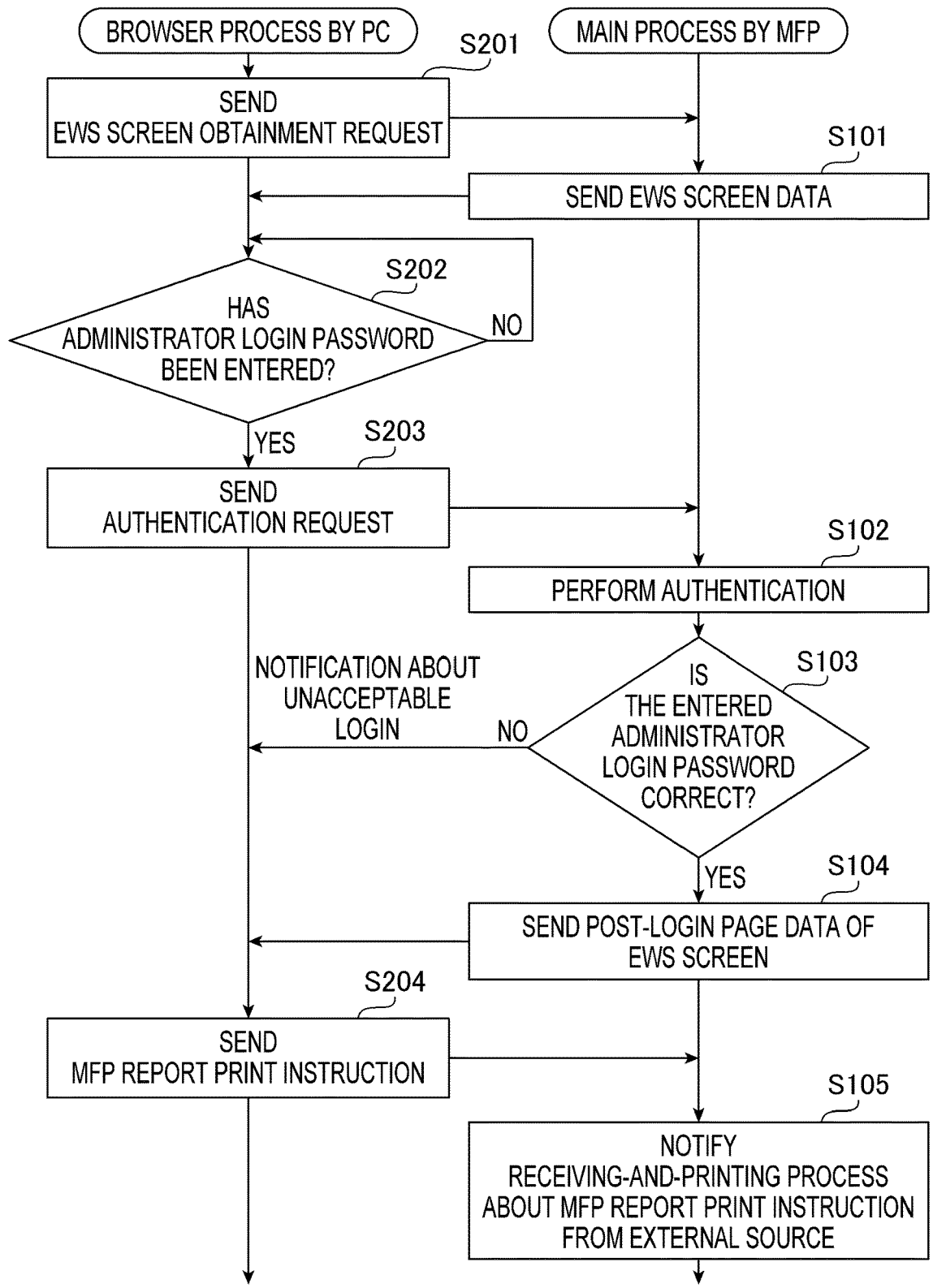
FIG. 10 is a flowchart showing procedures of a browser process by a PC and a main process by the MFP.

FIG. 10 shows a procedure for the PC 10 to send an MFP report print instruction to the MFP 100. Here, the MFP report is a report for managing the MFP 100 in the illustrative embodiment. More specifically, for instance, the MFP report is a report to provide the administrator with various types of information regarding the MFP 100 such as a remaining amount of toner, the number of printed sheets, and a usage status of each function. The MFP 100 stores, with execution of each function thereof, each piece of information indicating the usage status of each function into the NVM 104. The MFP 100 may select information to be printed, in accordance with information, included in the MFP report print instruction, which indicates which usage status is to be printed as the MFP report.

The PC 10 starts a browser process shown in FIG. 10, in a state where a browser screen is shown on a display of the PC in response to the PC 10 receiving an instruction to launch a browser. When a login user of the PC 10, e.g., the administrator of the MFP 100 has entered a URL of an EWS ("EWS" is an abbreviation for "Embedded Web Server") onto the browser screen, the PC 10 sends an EWS screen obtainment request to the MFP 100 (S201). The EWS is an embedded Web server incorporated in the MFP 100, and is realized by processing by the CPU 101 of the MFP 100. In this case, a main process shown in FIG. 10 is a process by the CPU 101 as the EWS. The main process is started in response to the MFP 100 being turned on.

In response to receiving the EWS screen obtainment request from the PC 10, the CPU 101 of the MFP 100 sends to the PC 10 an EWS screen data corresponding to the received request (S101). The EWS screen is a type of Web page data. In response to receiving the EWS screen data from the MFP 100, the PC 10 displays the EWS screen on the browser screen. The PC 10 waits until an administrator login password is entered through a login password entry field provided in the EWS screen (S202: No). When the administrator login password has been entered (S202: Yes), the PC 10 sends to the MFP 100 a request for authentication with the entered administrator login password (S203).

In response to receiving the authentication request from the PC 10, the CPU of the MFP 100 performs the authentication (S102), and then determines whether the entered administrator login password is correct (S103). When determining that the entered administrator login password is not correct (S103: No), the CPU 10 sends a notification about the unacceptable login to the PC 10. Meanwhile, when determining that the entered administrator login password is correct (S103: Yes), the CPU 10 sends post-login page data of the EWS screen to the PC 10 (S104).

In response to receiving the post-login page data from the MFP 100, the PC 10 displays the post-login page on the browser screen. The post-login page includes an operator displayed that is for sending the MFP report print instruction to MFP100. When the operator has been operated by the administrator, the PC 10 sends the MFP report print instruction to the MFP 100 (S204).

In response to receiving the MFP report print instruction from the PC 10, the CPU 101 of the MFP 100 notifies the receiving-and-printing process (see FIGS. 6A to 6C), which will be next described, about the MFP report print instruction from the external device (i.e., the PC 10) (S105).

FIGS. 6A to 6C show a procedure of the receiving-and-printing process. In FIG. 6A, the CPU 101 first determines whether the CPU 101 has started receiving a print job (S1). Specifically, the CPU 101 determines whether there is data stored in a reception buffer. When determining that there is data stored in the reception buffer, the CPU 101 determines whether the data is a print job. Further, when determining that the data is a print job, the CPU 101 determines whether a leading end of the print job is stored. For instance, the reception buffer is provided in the RAM 103. The reception buffer is an area to store data received from an external device via the network I/F 108 or the local I/F 109. The data storable in the reception buffer is not limited to data from an external device but may include various notifications that the CPU 101 provides in the receiving-and-printing process. For instance, the notification in S78 (see FIG. 9) may be provided by storing, into the reception buffer, information identifying image data to be printed, specifically, information indicating a location where the image data to be printed is stored. In the illustrative embodiment, the print job may be a print job that is generated by the PC 10, then transmitted by the PC 10 via the communication network 40, and received by the MFP 100 via the network I/F 108, or may be a print job that the MFP 100 receives from the PC 10A (see FIG. 1) via the local I/F 109. It is noted that the PC 10A has substantially the same configuration as the PC 10. Namely, the following descriptions of the PC 10 may be applied as descriptions of the PC 10A.

FIG. 5 shows an example of the data structure of a print job 200. As shown in FIG. 5, the print job 200 has a configuration with PDL ("PDL" is an abbreviation for "Page Description Language") enclosed by PJL ("PJL" is an abbreviation for "Printer Job Language"). A leading end of the print job 200 is indicated by "<ESC>%-12345X@PJL." A terminal end of the print job 200 is indicated by "<ESC>%-12345X." Accordingly, when the print job to be received in S1 is the print job 200, the CPU 101 determines whether the receipt of the print job has been started, based on whether "<ESC>%-12345X@PJL" has been detected from the received data. In addition, the print job 200 contains information such as a name "test.txt" of the print job 200, a user name "suzuki," and "20210413201010" representing the date and time when the print job 200 was generated. It is noted that the data structure of the print job to be received by the MFP 100 may be different from the data structure of the print job 200. In the illustrative embodiment, however, it is assumed for the sake of explanatory convenience that the MFP 100 receives the print job having substantially the same data structure of the print job 200.

Referring back to FIG. 6A, when determining in S1 that the CPU 101 has started receiving a print job (S1: Yes), the CPU 101 determines whether the print job is associated with one of the registered MFP LoginUser Names (S2). Specifically, when the PcUser Name included in the print job matches one of the MFP LoginUser Names registered in the user DB 104a (see FIG. 4A), the CPU 101 determines that the print job is associated with one of the registered MFP LoginUser Names (S2: Yes). It is noted that the same user may use respective different user names for the MFP 100 and the PC 10. Therefore, in the user DB 104a, the MFP LoginUser Names used for the MFP 100 are associated with the PcUser Names used for the PC 10 that are included in print jobs. In the illustrative embodiment, it is assumed that the print job, which includes, as a PcUser Name, a user name of the user who is logging in to the PC 10, is generated by a printer driver of the PC 10. Hence, even if the PcUser Name included in the print job does not match any of the MFP LoginUser Names registered in the user DB 104a, the CPU 101 determines that the print job is associated with one of the registered MFP LoginUser Names (S2: Yes), when an MFP LoginUser Name associated with the PcUser Name included in the received print job is registered in the user DB 104a. Suppose for instance that the received print job includes "kato" as the PcUser Name. In this case, the PcUser Name "kato" and the MFP LoginUser Name "kat" are registered in the user DB 104a in association with each other, the CPU 101 determines that the print job is associated with one of the registered MFP LoginUser Names (S2: Yes).

When determining in S2 that the print job the CPU 101 has started receiving is associated with one of the registered MFP LoginUser Names (S2: Yes), the CPU 101 displays a reception-in-progress screen on the display 105a of the panel 105 (S3).

The aforementioned table data 104b has three potential internal states of the MFP 100 that represent that the MFP 100 is currently receiving a print job, i.e., "currently receiving a print job," "currently receiving a print job (the user who has sent the print instruction is logging in)," and "currently receiving a print job (via USB connection)." Therefore, when determining that the CPU 101 has started receiving a print job (S1: Yes), for instance, the CPU 101 needs to determine which of the three potential internal states corresponds to the current internal state, before proceeding to S2. First, the CPU 101 determines whether the print job the CPU 101 has started receiving is a print job via the network I/F 108 or a print job via the local I/F 109. The print job via the network I/F 108 and the print job via the local I/F 109 are stored in respective different areas of the aforementioned reception buffer. Hence, based on in which area of the reception buffer the print job is stored, the CPU 101 may determine whether the print job the CPU 101 has started receiving is a print job via the network I/F 108 or a print job via the local I/F 109. Then, when the CPU 101 is receiving the print job via the network I/F 108, the CPU 101 further determines whether the CPU 101 has started receiving the print job while the user who has sent the print instruction is logging in. When there is a login user, as described in the explanation of S76 in the login process (see FIG. 9), the selected LoginUser Name is stored in the RAM 103. Therefore, the CPU 101 determines whether the selected LoginUser Name matches the PcUser Name included in the print job. When the selected LoginUser Name does not match the PcUser Name included in the print job, the CPU 101 determines whether the selected LoginUser Name matches the MFP LoginUser Name associated in the user DB 104a with the PcUser Name included in the print job. When the selected LoginUser Name matches the PcUser Name included in the print job, the CPU 101 writes "currently receiving a print job (the user who has sent the print instruction is logging in)" into the internal state storage area. In addition, the same applies when the selected LoginUser Name matches the MFP LoginUser Name associated in the user DB 104a with the PcUser Name included in the print job. Meanwhile, when the selected LoginUser Name does not match the PcUser Name included in the print job, and does not match the MFP LoginUser Name associated in the user DB 104a with the PcUser Name included in the print job, the CPU 101 writes "currently receiving a print job" into the internal state storage area. When the CPU 101 is receiving the print job via the local I/F 109, the CPU 101 writes "currently receiving a print job (via USB connection)" into the internal state storage area. It is noted that in the illustrative embodiment, as described above, the USB I/F is employed as the local I/F 109.

In the aforementioned step S3 (see FIG. 6A), the CPU 101 displays the reception-in-progress screen on the display 105a of the panel 105. Specifically, the CPU 101 writes the screen ID "101" or "105" into the screen ID storage area. Here, the CPU 101 determines which of the screen IDs "101" and "105" is to be written into the screen ID storage area, based on the internal state of the MFP 100. More specifically, for instance, when the internal state of the MFP 100 is "currently receiving a print job," the CPU 101 writes the screen ID "101" into the screen ID storage area with reference to the table data 104b. Meanwhile, when the internal state of the MFP 100 is "currently receiving a print job (the user who has sent the print instruction is logging in)," the CPU 101 writes the screen ID "105" into the screen ID storage area. In addition, when the internal state of the MFP 100 is "currently receiving a print job (via USB connection)," the CPU 101 writes the screen ID "105" into the screen ID storage area.

In the display process (see FIGS. 8A and 8B), when neither a key notification nor a touch operation notification has been detected (S52: No), the CPU 101 determines whether the screen ID written in the screen ID storage area has changed (S59). When determining that the screen ID written in the screen ID storage area has changed (S59: Yes), the CPU 101 reads out display screen data associated with the changed screen ID from the NVM 104, and displays the read display screen data on the display 105a, thereby updating the screen (S60).

Figure 3C:
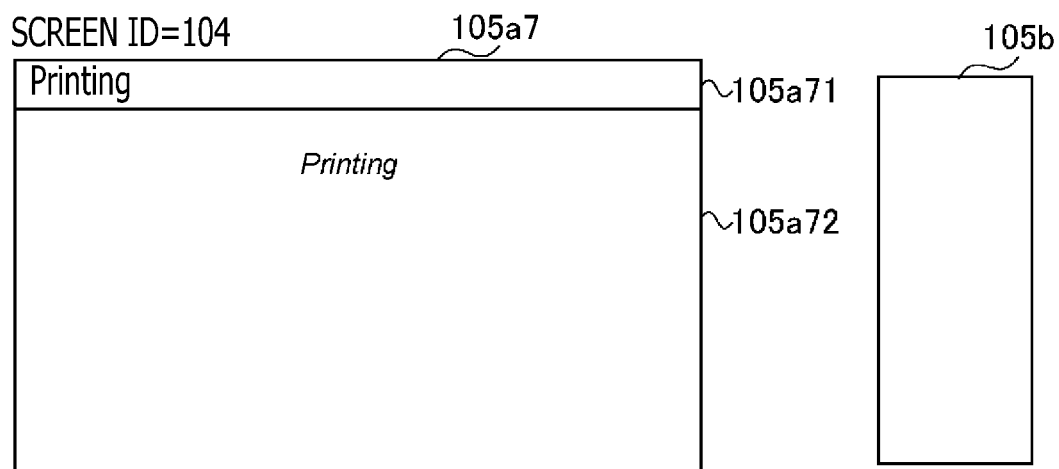
Figure 3D:
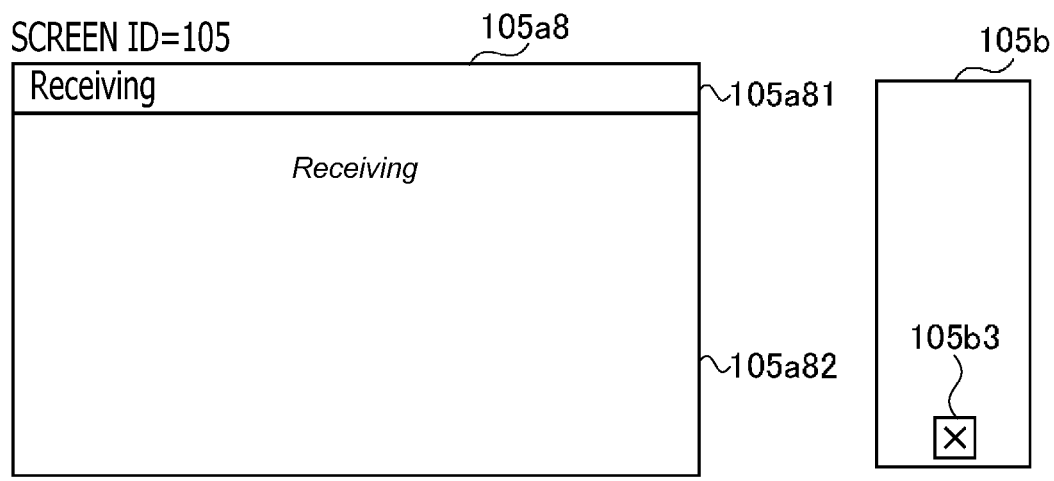

FIG. 2B shows an example of a reception-in-progress screen (screen ID=101) 105a2 displayed on the display 105a. The reception-in-progress screen 105a2 includes a display area 105a21 to display the internal state of the MFP 100, and a display area 105a22 to display an operational state of the MFP 100. FIG. 3D shows an example of a reception-in-progress screen (screen ID=105) 105a8 displayed on the display 105a. The reception-in-progress screen 105a8 includes a display area 105a81 to display the internal state of the MFP 100, and a display area 105a82 to display the operational status of the MFP 100. The reception-in-progress screen 105a2 shown in FIG. 2B and the reception-in-progress 105a8 shown in FIG. 3D have respective different screen IDs, but have substantially the same contents displayed thereon. However, the reception-in-progress screen 105a2 in FIG. 2B and the reception-in-progress 105a8 in FIG. 3D are different in whether the three keys 105b1 to 105b3 of the key input section 105b are in the turned-on state or the turned-off state. Turning on/off control of the three keys 105b1 to 105b3 is performed in the aforementioned panel operation process (see FIG. 7).

When determining in S31 that a panel operation to the panel 105 has not been detected (S31: No), the CPU 101 determines whether the screen ID written in the screen ID storage area has changed (S38), in substantially the same manner as in S59 (see FIG. 8B). When determining in S38 that the screen ID written in the screen ID storage area has changed (S38: Yes), the CPU 101 checks the internal state of the MFP 100 that is stored in the internal state storage area (S40). Then, based on the key pressing acceptability information associated with the internal state in the table data 104b, the CPU 101 turns on (the backlight for) each pressable (enabled) key and turns off (the backlight for) each un-pressable (disabled) key (S41). Specifically, for instance, when the internal state of the MFP 100 is "currently receiving a print job," as shown in FIG. 2B, the CPU 101 turns off all the three keys 105b1 to 105b3. Further, for instance, when the internal state of the MFP 100 is "currently receiving a print job (the user who has sent the print instruction is logging in)" or "currently receiving a print job (via USB connection)," as shown in FIG. 3D, the CPU 101 turns on only the cancel key 105b3, and turns off the other keys 105b1 and 105b2. Thus, whether each of the keys 105b1 to 105b3 is turned on/off corresponds to whether each of the keys 105b1 to 105b3 is enabled (pressable)/disabled (un-pressable).

Referring back to FIG. 6A, the CPU 101 next determines whether a storage printing function is enabled (S4). The storage printing function is a function to store a received print job in a memory and then perform printing according to the print job in response to user login. In the illustrative embodiment, the RAM 103 is employed as the memory for the storage printing function. However, examples of the memory for the storage printing function may include, but are not limited to, the NVM 104 and a USB memory attached to the USB I/F. A concept of the storage printing function may include a function to store the received print job in the memory as is and then perform printing according to the print job in response to user login. Further, the concept of the storage printing function may include a function to, as executed in the illustrative embodiment, perform RIP ("RIP" is an abbreviation for "Raster Image Processor") processing for the received print job to generate image data, then store the generated image data in the memory, and thereafter perform printing based on the image data in response to user login. In the illustrative embodiment, an example in which the generated image data is stored in the RAM 103 will be described (see the subsequent steps S5 and S6). Further, for instance, the storage printing function may be selectively set enabled or disabled in accordance with various settings for the MFP 100. Moreover, the storage printing function may be set enabled or disabled by the PC 10 via the network I/F 108.

When determining in S4 that the storage printing function is enabled (S4: Yes), the CPU 101 performs RIP processing for print data included in the print job (S5). Then, the CPU 101 stores RIP-processed image data into a particular area of the RAM 103 in association with the user name of the user who sent the original print job (S6). Specifically, when determining in S2 that the PcUser Name included in the print job matches one of the MFP LoginUser Names registered in the user DB 104a, the CPU 101 stores the image data in association with the MFP LoginUser Name that matches the PcUser Name. Moreover, when determining in S2 that the MFP LoginUser Name associated with the PcUser Name included in the received print job is registered in the user DB 104a, the CPU 101 stores the image data in association with the MFP LoginUser Name associated with the PcUser Name.

Next, the CPU 101 determines whether the storing of the image data into the RAM 103 has been completed (S7). When determining that the storing of the image data into the RAM 103 has not been completed (S7: No), the CPU 101 determines whether a key notification of cancellation has been received (S8). When determining that a key notification of cancellation has not been received (S8: No), the CPU 101 goes back to S7. Meanwhile, when determining that a key notification of cancellation has been received (S8: Yes), the CPU 101 cancels, on the way, the storing of the image data into the RAM 103 (S9). Thereafter, the CPU 101 proceeds to S16. Moreover, when the CPU 101 is, while receiving a print job, performing RIP processing for the print data included in the print job and storing the RIP-processed image data, the CPU 101 cancels not only the storing of the image data into the RAM 103 but also the receipt of the print job. Here, the CPU 101 provides the key notification of cancellation in S56 of the display process (see FIGS. 8A and 8B). Before that, the CPU 101 determines whether the cancel key 105b3 is pressable (enabled), in S34 of the panel operation process (see FIG. 7). Therefore, control of the key notification of cancellation will be described based on relevant processes in the panel operation process and the display process.

When determining in S32 (see FIG. 7) that the detected panel operation is a key operation to the key input section 105b (S32: Yes), the CPU 101 checks the internal state of the MFP 100 that is stored in the internal state storage area (S33), in substantially the same manner as in S40. Next, the CPU 101 refers to the table data 104b (see FIG. 4B) and determines whether the key operation is a key operation to a pressable (enabled) key in the current internal state of the MFP 100 (S34). In the table data 104b, when the current internal state of the MFP 100 is "currently receiving a print job," the key pressing acceptability information for all the three keys (i.e., the back key 105b1, the home key 105b2, and the cancel key 105b3) included in the key input section 105b is "NG." Therefore, in this case, whichever of the three keys 105b1 to 105b3, has been operated, the CPU 101 determines in S34 that the key operation is not a key operation to a pressable (enabled) key in the current internal state of the MFP 100 (S34: No). Meanwhile, in the table data 104b, when the current internal state of the MFP 100 is "currently receiving a print job (the user who has sent the print instruction is logging in)" or "currently receiving a print job (via USB connection)," the key pressing acceptability information for the back key 105b1 and the home key 105b2 is "NG," but the key pressing acceptability information for the cancel key 105b3 is "OK." Therefore, in this case, if the key operation is a key operation to the cancel key 105b3, the CPU 101 will determine in S34 that the key operation is a key operation to a pressable (enabled) key in the current internal state of the MFP 100 (S34: Yes).

When determining in S34 that the key operation is a key operation to a pressable (enabled) key in the current internal state of the MFP 100 (S34: Yes), the CPU 101 notifies the display process about the operated key (S35). Thereafter, the CPU 101 goes back to S31. Meanwhile, when determining that the key operation is not a key operation to a pressable (enabled) key in the current internal state of the MFP 100 (S34: No), the CPU 101 sounds a rejection tone to notify the operator that the key operation has been rejected (S36). Thereafter, the CPU 101 goes back to S31. It is noted that in S35, as described above, the CPU 101 stores the information for identifying the operated key into the key notification storage area.

When the CPU 101 proceeds to S52 in the display process (see FIGS. 8A and 8B), the key notification may or may not be stored in the key notification storage area. Specifically, when the CPU 101 proceeds from S34 to S35, the key notification is stored in the key notification storage area. However, when the CPU 101 proceeds from S34 to S36, no key notification is stored in the key notification storage area. When the key notification is stored in the key notification storage area, no touch operation notification is stored in the touch operation notification storage area. When the CPU 101 has detected a key notification (S52: Yes), and the detected key notification represents that the home key 105b2 in the enabled state (S53: Yes), the CPU 101 goes back to S51 to display the home screen on the display 105a.

When determining in S53 that the home key 105b2 in the disabled state has been pressed or that the home key 105b2 has not been pressed (S53: No), the CPU 101 checks the screen being currently displayed (S54). Specifically, as described above, in S54, the CPU 101 checks the screen being currently displayed, by checking the screen ID written in the screen ID storage area. Then, based on the checked screen, the CPU 101 determines whether the process, which should be notified of the panel operation, is in execution (S55). As described above, when the screen ID checked in S54 is any of 101 to 105, the CPU 101 determines that the receiving-and-printing process (see FIGS. 6A to 6C) is in execution as the process which should be notified of the panel operation (S55: Yes). Then, the CPU 101 notifies the process, which should be notified of the panel operation, about the key corresponding to the key notification (S56). For instance, as shown in FIG. 3D, when the cancel key 105b3, which is in the turned-on state at the key input section 105b, has been pressed while the reception-in-progress screen 105a8 is displayed on the display 105a, the CPU 101 makes the affirmative determination in S52 (S52: Yes) and makes the affirmative determination in S55 (S55: Yes). Therefore, the CPU 101 notifies the receiving-and-printing process about the information for identifying the cancel key 105b3 pertaining to the key notification. In the receiving-and-printing process, when the CPU 101 receives the notification about the information for identifying the cancel key 105b3 (S8: Yes) before completing storing the image data (S7: No), the CPU 101 cancels the storing of the image data currently in progress (S9). It is noted that screen IDs are, although the screen IDs are not specified here, assigned to the screens to be displayed in the login process (see FIG. 9) and an after-mentioned menu screen as well. Therefore, when the list of users is displayed, and when the PIN input screen is displayed, the CPU 101 may determine that the CPU 101 should notify the login process about the panel operation. Further, when an operation to provide the MFP report print instruction is performed, the CPU 101 may determine that the CPU 101 should notify the receiving-and-printing process about the panel operation.

Pressing operations to the cancel key 105b3 include a short press and a long press. For instance, when the current internal state of the MFP 100 is "currently receiving a print job (the user who has sent the print instruction is logging in)," the CPU 101 may be in the middle of performing RIP processing for print data included in one print job of a plurality of jobs sent and storing the RIP-processed image data. At that time, when the cancel key 105b3 is short-pressed (i.e., pressed but not held for a long time), the CPU 101 cancels the storing of the one print job which is currently being stored. Further, at that time, when the cancel key 105b3 is long-pressed (i.e., pressed and held for a long time), the CPU 101 cancels the receipt of the one print job which is currently being stored, and cancels receipt of the remaining print job(s) which have been newly received during the long press of the cancel key 105b3. Namely, when receiving a plurality of print jobs while the cancel key 105b3 is being long-pressed, the CPU 101 cancels the receipt of all the plurality of print jobs. The key pressing acceptability (i.e., pressable (enabled)/un-pressable (disabled)) for the cancel key 105b3 in the aforementioned step S34 is applied to both the short press and the long press. Further, as mentioned above, when the CPU 101 is, while receiving one print job, storing image data based on the print job, the CPU 101 cancels the receipt of the print job regardless of whether the key operation is a short press or a long press.

On the other hand, as shown in FIG. 2B, when the cancel key 105b3 in the turned-off state at the key input section 105b is pressed while the reception-in-progress screen 105a2 is displayed on the display 105a, the CPU 101 makes a negative determination in S52 (S52: No). In this case, the CPU 101 is not allowed to proceed to S56. Therefore, the CPU 101 does not notify the receiving-and-printing process about the information for identifying the cancel key 105b3 pertaining to the key notification. Thereby, in the receiving-and-printing process, the CPU 101 does not receive the notification of the information for identifying the cancel key 105b3 pertaining to the key notification (S8: No). Hence, the storing of the image data is completed without being canceled on the way (S7: Yes). Thus, when the internal state of the MFP 100 is "currently receiving a print job," the receipt of the print job currently in progress is unable to be canceled by using the cancel key 105b3. Namely, the MFP 100 of the illustrative embodiment is enabled to prevent any person other than the user who has sent a print job for storage printing from canceling receipt of the print job while the MFP 100 is receiving the print job via the network 40 from the PC 10 located far from the MFP 100. In the illustrative embodiment, the CPU 101 is configured to take such control that when a key in the turned-off state has been pressed, the CPU 101 receives the key pressing operation itself (see S32 in the panel operation process), but does not perform a process according to the operated key (see S34 in the panel operation process). In other words, when the key in the turned-off state has been pressed, the CPU 101 receives the key pressing operation itself but does not accept an instruction corresponding to the operated key (i.e., the CPU 101 rejects the instruction entered in response to the key pressing operation). However, the CPU 101 may be configured to take such control that when a key in the turned-off state has been pressed, the CPU 101 does not receive the key pressing operation itself.

On the other hand, when determining in S7 that the storing of the image data into the RAM 103 has been completed (S7: Yes), the CPU 101 proceeds to S16. In S16, the CPU101 displays the home screen on the display 105a of the panel 105. Specifically, the CPU 101 writes the screen ID "100" into the screen ID storage area of the RAM 103. It is noted that before S16, the CPU 101 writes "operation completed" into the internal state storage area. Thereby, in S16, the CPU 101 displays the home screen on the display 105a by the process of S60 in the display process, since the CPU 101 refers to the table data 104b and writes into the screen ID storage area the screen ID "100" corresponding to when the internal state of the MFP 100 is "operation completed." After S16, the CPU 101 goes back to S1.

On the other hand, when determining in S4 that the storage print function is disabled (S4: No), the CPU 101 performs RIP processing for the print data included in the print job (S10), in substantially the same manner as in S5.

Then, the CPU 101 displays a printing-in-progress screen on the display 105a of the panel 105 (S11). Specifically, the CPU 101 writes the screen ID "102" into the screen ID storage area of the RAM 103. It is noted that before S11, the CPU 101 writes "currently printing image data" into the internal state storage area. Thereby, in S11, the CPU 101 displays the printing-in-progress screen on the display 105a, since the CPU 101 refers to the table data 104b and writes into the screen ID storage area the screen ID "102" corresponding to when the internal state of the MFP 100 is "currently printing image data." FIG. 3A shows an example of a printing-in-progress screen (screen ID=102, 103) 105a5 displayed on the display 105a. The printing-in-progress screen 105a5 includes a display area 105a51 to display the internal state of the MFP 100, and a display area 105a52 to display the operational state of the MFP 100. Further, the CPU 101 starts printing by outputting the RIP-processed image data to the print engine 111 (S12).

Next, the CPU 101 determines whether printing has been completed (S13). When determining that printing has not been completed (S13: No), the CPU 101 determines whether a key notification of cancellation has been received (S14), in substantially the same manner as in S8. When determining that a key notification of cancellation has not been received (S14: No), the CPU 101 goes back to S13. Meanwhile, when determining that a key notification of cancellation has been received (S14: Yes), the CPU 101 cancels the printing in progress (S15). Thereafter, the CPU 101 proceeds to S16.

FIG. 3A also shows the key input section 105b when the internal state of the MFP 100 is "currently printing image data." At the key input section 105b, only the cancel key 105b3 is in the turned-on state, and the other keys 105b 1 and 105b2 are in the turned-off state. Namely, this state of the key input section 105b in FIG. 3A is the same as the state of the key input section 105b in FIG. 3D. Thus, the cancel key 105b3 is enabled (pressable) when the internal state of the MFP 100 is "currently printing image data." Therefore, when the printing of the image data has not been completed (S13: No), if the cancel key 105b3 is pressed, the CPU 101 will receive a key notification of cancellation (S14: Yes). In this case, the CPU 101 then cancels the printing of the image data currently in progress (S15). Thus, when the internal state of the MFP 100 is "currently printing image data," the printing of the image data currently in progress may be canceled by using the cancel key 105b3. In this case, the printing of the image data currently in progress is not printing using by the storage print function. Hence, the cancellation of the printing is allowed.

Meanwhile, when determining in S13 that the printing of the image data has been completed (S13: Yes), the CPU 101 proceeds to S16.

Meanwhile, when determining in S2 that the print job, which the CPU 101 has started receiving, is not associated with any of the registered MFP LoginUser Names (S2: No), the CPU 101 cancels the receipt of the print job (S17), without performing RIP processing for the print data included in the print job. Thereafter, the CPU 101 terminates the receiving-and-printing process. It is noted that in S17, the CPU 101 may not cancel the receipt of the print job, but may perform printing based on the print job.

Meanwhile, when determining in S1 that the CPU 101 has not started receiving a print job (S1: No), the CPU 101 determines whether the CPU 101 has received the MFP report print instruction from an external device (S20 in FIG. 6C). The CPU 101 makes the determination in S20 according to whether the MFP report print instruction from an external device is stored in the reception buffer, more specifically, according to whether the CPU 101 has received a notification, provided in S105 (see FIG. 10) to the receiving-and-printing process, about the MFP report print instruction received from an external device.

When determining in S20 that the CPU 101 has received the MFP report print instruction from an external device (S20: Yes), the CPU 101 displays the printing-in-progress screen on the display 105a (S21). Specifically, the CPU 101 writes a screen ID "104" into the screen ID storage area of the RAM 103. It is noted that before S21, the CPU 101 writes "currently printing the MFP report according to the external instruction" into the internal state storage area. However, the timing, at which the CPU 101 writes "currently printing the MFP report according to the external instruction" into the internal state storage area, may be before or after S105 in which the CPU 101 notifies the receiving-and-printing process about the MFP report print instruction in response to receipt of the MFP report print instruction that the PC 10 has sent in S204 (see FIG. 10). Thereby, in S21, the CPU 101 displays the printing-in-progress screen on the display 105a by the process of S60 in the display process, since the CPU 101 refers to the table data 104b and writes into the screen ID storage area the screen ID "104" corresponding to when the internal state of the MFP 100 is "currently printing the MFP report according to the external instruction." FIG. 3C shows an example of a printing-in-progress screen (screen ID "104") 105a7 displayed on the display 105a. In substantially the same manner as the printing-in-progress screen 105a5 (see FIG. 3A), the printing-in-progress screen 105a7 includes a display area 105a71 to display the internal state of the MFP 100, and a display area 105a72 to display the operational state of the MFP 100. Subsequently, the CPU 101 generates image data of the MFP report as instructed, and outputs the generated image data to the print engine 111, thereby starting printing of the MFP report (S22). Thereafter, the CPU 101 proceeds to S13 (see FIG. 6B).

FIG. 3C also shows the key input section 105b when the internal state of the MFP 100 is "currently printing the MFP report according to the external instruction." At the key input section 105b, all the three keys 105b1 to 105b3 are in the turned-off state. Namely, the state of the key input section 105b in FIG. 3C is the same as the state of the key input section 105b in FIG. 2B. Accordingly, when the internal state of the MFP 100 is "currently printing the MFP report according to the external instruction," the cancel key 105b3 is disabled (un-pressable). Therefore, when the printing of the MFP report has not been completed (S13: No), even though the cancel key is pressed, the CPU 101 does not receive a key notification of cancellation (S14: No). Hence, the printing of the MFP report is completed without being canceled on the way (S13: Yes). Thus, when the internal state of the MFP 100 is "currently printing the MFP report according to the external instruction," the printing of the MFP report currently in progress is unable to be canceled by using the cancel key 105b3. Thereby, it is possible to prevent others different from the user of the PC 10 from canceling the printing of the MFP report while the MFP 100 is printing the MFP report in response to an external instruction, for instance, from the PC 10.

On the other hand, when determining in S20 that the CPU 101 has not received the MFP report print instruction from an external device (S20: No), the CPU 101 determines whether the CPU 101 has received a notification about the MFP report print instruction from the panel 105 (S23). The MFP report print instruction may be provided not only from external devices but also from the display 105a of the panel 105. Specifically, for instance, when a menu button (not shown) on the home screen 105a1 has been operated while the home screen 105a1 (see FIG. 2A) is displayed on the display 105a, the menu screen may be displayed. Further, when the MFP report print instruction has been provided by a touch operation to the menu screen, the CPU 101 may notify the receiving-and-printing process about the MFP report print instruction.

When determining in S23 that the CPU 101 has received a notification about the MFP report print instruction from the panel 105 (S23: Yes), the CPU 101 displays the printing-in-progress screen on the display 105a of the panel 105 (S24). Specifically, the CPU 101 writes the screen ID "103" into the screen ID storage area of the RAM 103. It is noted that before S24, the CPU 101 writes "currently printing the MFP report according to the instruction from the panel" into the internal state storage area. However, the timing, at which the CPU 101 writes "currently printing the MFP report according to the instruction from the panel" into the internal state storage area, may be before or after the CPU 101 notifies the receiving-and-printing process about the MFP report print instruction in response to acceptance of the touch operation to provide the MFP report print instruction via the menu screen. Thereby, in S24, the CPU 101 displays the printing-in-progress screen on the display 105a by the process of S60 in the display process, since the CPU 101 refers to the table data 104b and writes into the screen ID storage area the screen ID "103" corresponding to when the internal state of the MFP 100 is "currently printing the MFP report according to the instruction from the panel." The printing-in-progress screen 105a5 in FIG. 3A serves as both the printing-in-progress screen of the screen ID "102" and the printing-in-progress screen of the screen ID "103." Next, the CPU 101 proceeds to S22.

The key input section 105b in FIG. 3A serves as both the key input section 105b when the internal state of the MFP 100 is "currently printing image data" and the key input section 105b when the internal state of the MFP 100 is "currently printing the MFP report according to the instruction from the panel." Accordingly, when the internal state of the MFP 100 is "currently printing the MFP report according to the instruction from the panel," the cancel key 105b3 is enabled (pressable) in substantially the same manner as when the internal state of the MFP 100 is "currently printing image data." Hence, when the printing of the MFP report has not been completed (S13: No), if the cancel key 105b3 is pressed, the CPU 101 will receive a key notification of cancellation (S14: Yes). In this case, the CPU 101 then cancel the printing of the MFP report currently in progress (S15). Thus, when the internal state of the MFP 100 is "currently printing the MFP report according to the instruction from the panel," the printing of the MFP report currently in progress may be canceled by using the cancel key 105b3. This is because the cancellation of the printing with the cancel key 105b3 in the above situation means that the user who has provided the MFP report print instruction from the panel 105 cancels the printing by himself or herself.

Meanwhile, when determining in S23 that the CPU 101 has not received a notification about the MFP report print instruction from the panel 105 (S23: No), the CPU 101 determines whether the CPU 101 has received a notification about an instruction to print already-stored image data (S25). The notification about the instruction to print already-stored image data is provided to the receiving-and-printing process in S78 of the login process.

When determining in S25 that the CPU 101 has received a notification about the instruction to print already-stored image data (S25: Yes), the CPU 101 displays the printing-in-progress screen on the display 105*a* of the panel 105 (S26). Specifically, the CPU 101 writes the screen ID "102" into the screen ID storage area of the RAM 103. It is noted that before S26, the CPU 101 writes "currently printing already-stored image data" into the internal state storage area. However, the timing, at which the CPU 101 writes "currently printing already-stored image data" into the internal state storage area, may be before or after S78 (see FIG. 9) in which the CPU 101 notifies the receiving-and-printing process about the instruction to print already-stored image data. Thereby, in S24, the CPU 101 displays the printing-in-progress screen of the screen ID "102" on the display 105*a*, since the CPU 101 refers to the table data 104*b* and writes into the screen ID storage area the screen ID "102" corresponding to when the internal state of the MFP 100 is "currently printing already-stored image data." Subsequently, the CPU 101 starts printing by outputting the already-stored image data to the print engine 111 (S27). Thereafter, the CPU 101 proceeds to S13 (see FIG. 6B). In the instruction to print already-stored image data, the image data to be printed have already been specified. Hence, in S26, the CPU 101 has only to output the specified image data to the print engine 111. FIG. 3A shows the printing-in-progress screen 105*a*5 as an example of the printing-in-progress screen of the screen ID "102." FIG. 3A also shows the key input section 105*b* in the case where the internal state of the MFP 100 is "currently printing already-stored image data." Accordingly, when the internal state of the MFP 100 is "currently printing already-stored image data," the cancel key 105*b*3 is enabled (pressable) in substantially the same manner as when the internal state of the MFP 100 is "currently printing image data" or "currently printing the MFP report according to the instruction from the panel." Hence, when the printing of the already-stored image data has not been completed (S13: No), if the cancel key 105*b*3 is pressed, the CPU 101 will receive a key notification of cancellation (S14: Yes). In this case, the CPU 101 then cancel the printing of the already-stored image data currently in progress (S15). Thus, when the internal state of the MFP 100 is "currently printing already-stored image data," the printing of the already-stored image data currently in progress may be canceled by using the cancel key 105*b*3. Thereby, the login user is allowed to cancel the printing of the already-stored image data with respect to the storage print job that the login user himself or herself has provided to the PC 10A.

On the other hand, when determining in S25 that the CPU 101 has not received a notification about the instruction to print already-stored image data (S25: No), the CPU 101 goes back to S1 (see FIG. 6A).

In the illustrative embodiment, when having received a key notification of cancellation (S8: Yes) while receiving a print job in the case where the storage printing function is enabled, the CPU 101 cancels the receipt of the print job (S9). Meanwhile, it is not taken into account that the CPU 101 receives a key notification of cancellation while receiving a print job in the case where the storage printing function is disabled. However, in another instance of the illustrative embodiment, even though the storage printing function is disabled, when having received a key notification of cancellation while receiving a print job, the CPU 101 may cancel the receipt of the print job, in substantially the same manner as when the storage printing function is enabled. Thereby, the MFP 100 of the illustrative embodiment is enabled to prevent any person other than the user who has sent a print job for storage printing from canceling receipt of the print job while the MFP 100 is receiving the print job for storage printing that has been sent via the communication network 40 from the PC 10 located far from the MFP 100.

In the illustrative embodiment, while the reception-in-progress screen 105*a*2 is displayed on the display 105*a*, the CPU 101 does not notify the receiving-and-printing process about that the cancel key has been pressed. Furthermore, while the reception-in-progress screen 105*a*8 is displayed on the display 105*a* as well, the CPU 101 may not notify the receiving-and-printing process about that the cancel key has been pressed. Thereby, the MFP 100 of the illustrative embodiment is enabled to, at least, prevent any person other than the user who has sent a print job for storage printing from canceling receipt of the print job while the MFP 100 is receiving the print job for storage printing that has been sent via the communication network 40 from the PC 10 located far from the MFP 100.

Further, when the internal state of the MFP 100 is "currently receiving a print job (the user who has sent the print instruction is logging in)," the CPU 101 may display the reception-in-progress screen 105*a*2 of the screen ID "101" on the display 105*a*.

In the illustrative embodiment, the key input section 105*b* includes the three keys 105*b*1 to 105*b*3, each of which is configured to be switched between the turned-on state and the turned-off state. However, instead of the three keys 105*b*1 to 105*b*3, buttons corresponding thereto may be displayed on the display 105*a*. In this case, instead of the control to turn on (the backlight for) each pressable (enabled) key and turn off (the backlight for) each un-pressable (disabled) key in S41, the corresponding buttons may be controlled in such a manner that each enabled button is displayed on the display 105*a* whereas each disabled button is not displayed.

In the illustrative embodiment, a communication I/F, which is configured to establish a local connection between the MFP 100 and each external device such as the PC 10A over a short distance, is employed as the local I/F 109. However, a communication I/F, using a communication system that mainly presupposes a one-to-one connection between the MFP 100 and an external device, may be employed as the local I/F 109. Specifically, in this case, a communication I/F using, for instance, a Bluetooth communication system or a Wi-Fi Direct communication system may be employed as the local I/F 109. It is noted that "Wi-Fi" is a registered trademark of the non-profit Wi-Fi Alliance, and "Bluetooth" is a registered trademark of Bluetooth SIG, Inc.

While aspects of the present disclosure have been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiment(s) according to aspects of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations according to aspects of the disclosure are provided below:

The aforementioned illustrative embodiment has been described with the MFP 100 as an example of a "printing apparatus" according to aspects of the present disclosure. However, examples of the "printing apparatus" may include, but are not limited to, a stand-alone printer, as well as the MFP 100.

In the aforementioned illustrative embodiment, the single CPU 101 is used as an example of a "controller" according to aspects of the present disclosure. However, the "controller" may include one or more CPUs, each of which may include one or more cores. Further, the "controller" may include one or more dedicated circuits, as well as one or more CPUs. Examples of the "one or more dedicated circuits" may include, but are not limited to, ASICs and FPGAs. Moreover, the "controller" may include, as well as the CPU 101, the NVM 104 storing the control programs 104*a*, which are configured to, when executed by the CPU 101, cause the CPU 101 to perform processes such as the receiving-and-printing process (see FIGS. 6A to 6C), the panel operation process (see FIG. 7), the display process (see FIGS. 8A and 8B), and the login process (see FIG. 9).

In the aforementioned illustrative embodiment, after successful login with a user name input (selected) via the panel 105, the CPU 101 may perform printing based on stored image data if the image data has been stored by the login user identified by the selected user name. However, the login process may not necessarily be required. For instance, even after merely accepting a user name input via the panel 105, the CPU 101 may perform printing based on stored image data if the image data has been stored by the user identified by the input user name.

The following shows examples of associations between elements exemplified in the aforementioned illustrative embodiment and modifications, and elements according to aspects of the present disclosure. For instance, the printing system 1 may be an example of a "printing system" according to aspects of the present disclosure. The MFP 100 may be an example of a "printing apparatus" according to aspects of the present disclosure. The PC 10 may be an example of an "information processing device" according to aspects of the present disclosure. The network OF 108 may be an example of a "communication interface" according to aspects of the present disclosure. The panel 105 may be an example of a "user interface" according to aspects of the present disclosure, and may be an example of a "display" according to aspects of the present disclosure. The NVM 104 may be an example of a "memory" according to aspects of the present disclosure. Further, the ROM 102 may be included in examples of the "memory" according to aspects of the present disclosure. The CPU 101 may be included in a "controller" according to aspects of the present disclosure. Further, the NVM 104 storing the control programs 104*a* may be an example of a "non-transitory computer-readable medium storing computer-readable instructions" according to aspects of the present disclosure, and may be included in the "controller" according to aspects of the present disclosure. The MFP report may be an example of "internal data" according to aspects of the present disclosure.

What is claimed is:

1. A printing apparatus comprising:
a communication interface;
a user interface;
a memory; and
a controller configured to
in response to receiving a print instruction, perform printing of internal data stored in the memory,
in response to a cancel instruction being input via the user interface, determine whether to continue or cancel the printing of the internal data stored in the memory, based on whether the print instruction has been received via the communication interface from an external device or the user interface, and
when the print instruction has been received via not the user interface but the communication interface from the external device, continue without canceling the printing, even when the cancel instruction has been input, whereas when the print instruction has been received via not the communication interface from the external device but the user interface, accept the cancel instruction and cancel the printing.

2. The printing apparatus according to claim 1, wherein the controller is further configured to:
in response to receiving a print job containing a user name via the communication interface, store the print job in the memory without performing printing based on the print job, and then perform the printing based on the stored print job when accepting the user name input via the user interface;
when the cancel instruction has been input via the user interface while the print job is being received, continue without canceling the receipt of the print job; and
when the cancel instruction has been input via the user interface while the printing based on the stored print job is being performed after acceptance of the user name input via the user interface, accept the cancel instruction and cancel the printing based on the stored print job.

3. The printing apparatus according to claim 1, wherein the controller is further configured to:
switch the user interface between a first mode in which the user interface is enabled to accept the cancel instruction and a second mode in which the user interface is disabled to accept the cancel instruction;
when the printing of the internal data stored in the memory is performed in response to the print instruction received via the communication interface, set the user interface into the second mode, and not accept the cancel instruction even if the cancel instruction is input, thereby continuing without canceling the printing; and
when the printing of the internal data stored in the memory is performed in response to the print instruction received via the user interface, set the user interface into the first mode, and accept the cancel instruction if the cancel instruction is input, thereby canceling the printing.

4. The printing apparatus according to claim 1, wherein the communication interface is configured to perform communication with an external device, the external device being configured to send to the printing apparatus a request for user authentication to authorize an authenticated user to send an instruction from the external device to the printing apparatus, and
wherein the controller is further configured to continue without canceling the printing of the internal data stored in the memory, when the cancel instruction has been input via the user interface while the printing is being performed in response to the print instruction received via the communication interface from the external device after successful user authentication.

5. The printing apparatus according to claim 4, wherein the controller is further configured to:
send Web page data for user authentication to the external device via the communication interface; and
continue without canceling the printing of the internal data stored in the memory, when the cancel instruction has been input via the user interface while the printing is being performed in response to the print instruction received via the communication interface from the external device after the user authentication has been successfully performed through a Web page displayed based on the Web page data.

6. The printing apparatus according to claim 1, wherein the controller is further configured to:
   send Web page data for the print instruction to an external device via the communication interface; and
   continue without canceling the printing of the internal data stored in the memory, when the cancel instruction has been input via the user interface while the printing is being performed in response to the print instruction received via the communication interface from the external device after the external device has received the Web page data and sent the print instruction via a Web page displayed based on the Web page data.

7. The printing apparatus according to claim 1, wherein the controller comprises:
   a processor; and
   a non-transitory computer-readable medium storing computer-readable instructions configured to, when executed by the processor, cause the processor to
   in response to receiving the print instruction, perform printing of internal data stored in the memory,
   in response to the cancel instruction being input via the user interface, determine whether to cancel the printing of the internal data stored in the memory, based on whether the print instruction has been received via the communication interface or the user interface, and
   when the print instruction has been received via the communication interface, continue without canceling the printing, whereas when the print instruction has been received via the user interface, accept the cancel instruction and cancel the printing.

8. A printing apparatus comprising:
   a communication interface;
   a user interface;
   a memory; and
   a controller configured to
   in response to receiving a print instruction, perform printing of internal data stored in the memory,
   in response to a cancel instruction being input via the user interface, determine whether to cancel the printing of the internal data stored in the memory, based on whether the print instruction has been received via the communication interface or the user interface, and
   when the print instruction has been received via the communication interface, continue without canceling the printing, whereas when the print instruction has been received via the user interface, accept the cancel instruction and cancel the printing,
   wherein the controller is further configured to
   when the cancel instruction has been input via the user interface while the printing of the internal data stored in the memory is being performed in response to the print instruction received via the communication interface, continue without canceling the printing of the internal data stored in the memory, and
   when the cancel instruction has been input via the user interface while the printing of the internal data stored in the memory is being performed in response to the print instruction received via the user interface, accept the cancel instruction and cancel the printing of the internal data stored in the memory.

9. The printing apparatus according to claim 8, wherein the controller is further configured to:
   in response to receiving a print job containing a user name via the communication interface, store the print job in the memory without performing printing based on the print job, and then perform the printing based on the stored print job when accepting the user name input via the user interface;
   when the cancel instruction has been input via the user interface while the print job is being received, continue without canceling the receipt of the print job; and
   when the cancel instruction has been input via the user interface while the printing based on the stored print job is being performed after acceptance of the user name input via the user interface, accept the cancel instruction and cancel the printing based on the stored print job.

10. The printing apparatus according to claim 8, wherein the controller is further configured to:
    switch the user interface between a first mode in which the user interface is enabled to accept the cancel instruction and a second mode in which the user interface is disabled to accept the cancel instruction;
    when the printing of the internal data stored in the memory is performed in response to the print instruction received via the communication interface, set the user interface into the second mode, and not accept the cancel instruction even if the cancel instruction is input, thereby continuing without canceling the printing; and
    when the printing of the internal data stored in the memory is performed in response to the print instruction received via the user interface, set the user interface into the first mode, and accept the cancel instruction if the cancel instruction is input, thereby canceling the printing.

11. The printing apparatus according to claim 8, wherein the communication interface is configured to perform communication with an external device, the external device being configured to send to the printing apparatus a request for user authentication to authorize an authenticated user to send an instruction from the external device to the printing apparatus, and
    wherein the controller is further configured to continue without canceling the printing of the internal data stored in the memory, when the cancel instruction has been input via the user interface while the printing is being performed in response to the print instruction received via the communication interface from the external device after successful user authentication.

12. The printing apparatus according to claim 11, wherein the controller is further configured to:
    send Web page data for user authentication to the external device via the communication interface; and
    continue without canceling the printing of the internal data stored in the memory, when the cancel instruction has been input via the user interface while the printing is being performed in response to the print instruction received via the communication interface from the external device after the user authentication has been successfully performed through a Web page displayed based on the Web page data.

13. The printing apparatus according to claim 8, wherein the controller is further configured to:
    send Web page data for the print instruction to an external device via the communication interface; and
    continue without canceling the printing of the internal data stored in the memory, when the cancel instruction has been input via the user interface while the printing is being performed in response to the print instruction received via the communication interface from the external device after the external device has received the Web page data and sent the print instruction via a Web page displayed based on the Web page data.

14. The printing apparatus according to claim 8, wherein the controller comprises:
a processor; and
a non-transitory computer-readable medium storing computer-readable instructions configured to, when executed by the processor, cause the processor to
in response to receiving the print instruction, perform printing of internal data stored in the memory,
in response to the cancel instruction being input via the user interface, determine whether to cancel the printing of the internal data stored in the memory, based on whether the print instruction has been received via the communication interface or the user interface, and
when the print instruction has been received via the communication interface, continue without canceling the printing, whereas when the print instruction has been received via the user interface, accept the cancel instruction and cancel the printing.

15. A printing apparatus comprising:
a communication interface;
a user interface;
a memory;
a display; and
a controller configured to
receive a print job via the communication interface;
perform printing;
determine whether to cancel the print job in response to a cancel instruction input via the user interface while the print job is being received, based on a first condition, and
determine whether to cancel the printing in response to a cancel instruction input via the user interface while the printing is being performed, based on a second condition different from the first condition,
wherein the controller is further configured to
display a first-mode screen on the display, when in a state to determine whether to cancel the print job in response to the cancel instruction input via the user interface while the print job is being received, based on the first condition, and
display a second-mode screen on the display, when in a state to determine whether to cancel the printing in response to the cancel instruction input via the user interface while the printing is being performed, based on the second condition.

16. The printing apparatus according to claim 15, wherein the controller comprises:
a processor; and
a non-transitory computer-readable medium storing computer-readable instructions configured to, when executed by the processor, cause the processor to
determine whether to cancel the print job in response to the cancel instruction input via the user interface while the print job is being received, based on the first condition, and
determine whether to cancel the printing in response to the cancel instruction input via the user interface while the printing is being performed, based on the second condition.

* * * * *